(12) United States Patent
Mori

(10) Patent No.: US 11,315,097 B2
(45) Date of Patent: Apr. 26, 2022

(54) STORE SYSTEM

(71) Applicant: TOSHIBA TEC KABUSHIKI KAISHA, Tokyo (JP)

(72) Inventor: Haruki Mori, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/986,883

(22) Filed: Aug. 6, 2020

(65) Prior Publication Data

US 2021/0174327 A1 Jun. 10, 2021

(30) Foreign Application Priority Data

Dec. 10, 2019 (JP) .............................. JP2019-223245

(51) Int. Cl.
*G06Q 20/20* (2012.01)
*G07G 1/00* (2006.01)

(52) U.S. Cl.
CPC ......... *G06Q 20/208* (2013.01); *G06Q 20/201* (2013.01); *G07G 1/0054* (2013.01)

(58) Field of Classification Search
CPC ... G06Q 20/208; G06Q 20/201; G07G 1/0054
See application file for complete search history.

(56) References Cited

U.S. PATENT DOCUMENTS

| | | | |
|---|---|---|---|
| 10,043,119 B1* | 8/2018 | Egan | G08B 13/24 |
| 2008/0000967 A1* | 1/2008 | Do | G07G 3/003 |
| | | | 235/383 |
| 2014/0263631 A1* | 9/2014 | Muniz | G01G 19/4144 |
| | | | 235/383 |
| 2015/0095189 A1* | 4/2015 | Dharssi | G07G 1/0081 |
| | | | 705/26.8 |
| 2017/0186285 A1 | 6/2017 | Kakino | |
| 2018/0096567 A1* | 4/2018 | Farrow | G06Q 20/4016 |
| 2018/0218351 A1* | 8/2018 | Chaubard | H04N 7/181 |
| 2019/0236597 A1* | 8/2019 | Huang | G06Q 20/363 |
| 2020/0074432 A1* | 3/2020 | Valdman | G06Q 10/087 |
| 2020/0198680 A1* | 6/2020 | Hagen | B62B 5/0096 |
| 2020/0279240 A1* | 9/2020 | Glaser | G06K 9/00664 |
| 2021/0027360 A1* | 1/2021 | Shmueli | G06K 9/00375 |

FOREIGN PATENT DOCUMENTS

JP 2017-117299 A 6/2017

OTHER PUBLICATIONS

B. Wu, W. Tseng, Y. Chen, S. Yao and P. Chang, "An intelligent self-checkout system for smart retail," 2016 International Conference on System Science and Engineering (ICSSE), 2016. (Year: 2016).*
R. Bobbit, J. Connell, N. Haas, C. Otto, S. Pankanti and J. Payne, "Visual item verification for fraud prevention in retail self-checkout," 2011 IEEE Workshop on Applications of Computer Vision (WACV), 2011. (Year: 2011).*

* cited by examiner

*Primary Examiner* — Nathan A Mitchell
(74) *Attorney, Agent, or Firm* — Foley & Lardner LLP

(57) ABSTRACT

A store system includes a server and a store terminal. The server receives data based on purchased commodities respectively input in a plurality of mobile terminals. The server stores the received data based on the purchased commodities. The store terminal acquires, from the stored data, the data based on the purchased commodity input in any one of the mobile terminals. The store terminal instructs correction of the acquired data. The server executes the instructed correction concerning the stored data.

18 Claims, 17 Drawing Sheets

STORE SYSTEM

CROSS-REFERENCE TO RELATED APPLICATION

This application is based upon and claims the benefit of priority to Japanese Patent Application No. 2019-223245, filed in Dec. 10, 2019, the entire contents of which are incorporated herein by reference.

FIELD

Embodiments described herein relate generally to a store system.

BACKGROUND

There is a store system in which a consumer operates a mobile terminal and inputs data based on a purchased commodity to simplify input operation for the data during accounting. However, the data input via the mobile terminal is not always correct. For example, in some cases such as that described in related art JP-A-2017-117299, a commodity is registered at a selling price different from a price tag or a set discount is not correctly performed. In such a case, in the store system in the present state, the data input via the mobile terminal is discarded. The data is input to an accounting machine by a store clerk again. At this time, the store clerk performs, on the wrong data, processing such as a selling price change or discount amount setting. Since such measures are taken in the past, a load on a server required for the processing of the data input via the mobile terminal is wasted.

DETAILED DESCRIPTION

The embodiments described herein aim to provide a store system that, even if there is an error in data input via a mobile terminal, can correct the error without discharging the data and reduce a load required for data processing of a server.

According to an embodiment, a store system can include a server and a store terminal. The server includes a receiving unit (e.g., a receiver), a storing unit (e.g., a memory), and a correcting unit (e.g., a processor). The receiving unit receives data based on purchased commodities respectively input in a plurality of mobile terminals. The storing unit stores the data based on the purchased commodities received by the receiving unit. The correcting unit executes, concerning the data stored by the storing unit, correction instructed by a correction instructing unit explained below. The store terminal includes an acquiring unit and a correction instructing unit (e.g., a processor). The acquiring unit acquires, from the data stored by the storing unit, the data based on the purchased commodity input in any one of the mobile terminals. The correction instructing unit instructs correction of the data acquired by the acquiring unit.

A store system according to an embodiment is explained below with reference to the drawings.

In the embodiment, a store system is illustrated in which a consumer using a shopping cart operates a mobile terminal attached to the cart and inputs data based on a purchased commodity by himself or herself.

Figure 1:
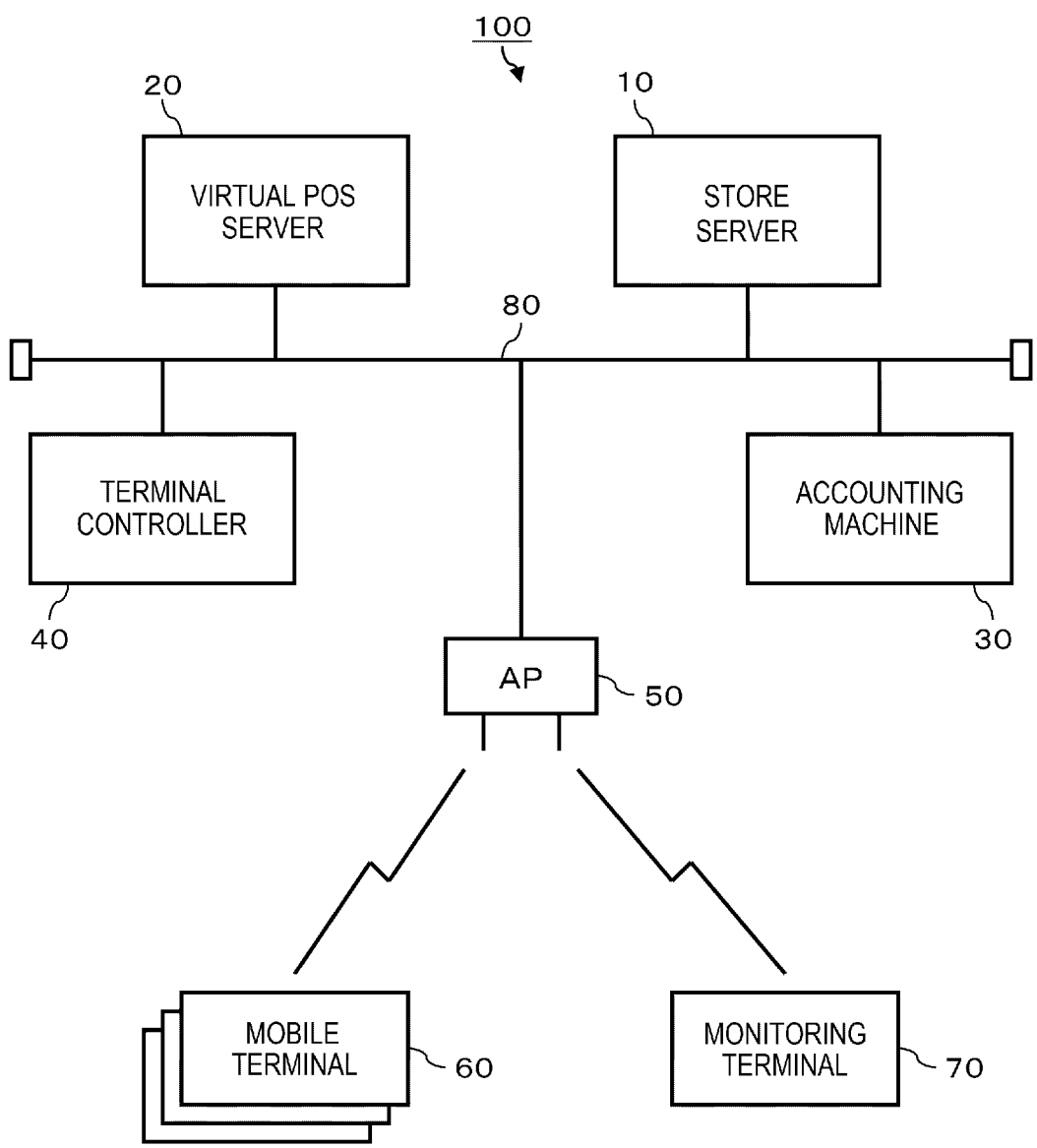
FIG. 1 is a block diagram schematically illustrating a store system according to an embodiment.

FIG. 1 is a block diagram schematically illustrating a store system 100 according to the embodiment. The store system 100 includes a store server 10, a virtual POS server 20, an accounting machine 30, a terminal controller 40, an access point 50, mobile terminals 60, a monitoring terminal 70, and a communication network 80. The communication network 80 may be a wired LAN (Local Area Network). That is, the store server 10, the virtual POS server 20, the accounting machine 30, the terminal controller 40, and the access point 50 are respectively connected to a communication cable to configure the communication network 80. The communication network 80 may also be a wireless LAN.

The access point 50 is a device configuring a separate wireless LAN in conjunction with the mobile terminals 60 and the monitoring terminal 70. The access point 50 is a relay point for data exchanged between the mobile terminals 60 or the monitoring terminal 70 connected by the wireless LAN and the devices connected by the wired LAN (e.g., communication network 80). The number of access points 50 is not limited to one. Two or more access points 50 may be connected to the communication network 80 considering a size, a layout, and the like of a store.

The mobile terminal 60 is a portable electronic device for supporting a shopping action of a consumer in a store in which the store system 100 is constructed. Typically, a consumer is an operator of the mobile terminal 60. For example, the mobile terminal 60 is attached to a shopping cart during use. The mobile terminal 60 may be lent from the store to the consumer and carried by the consumer. The mobile terminal 60 may be an information terminal such as a smart phone or a tablet terminal carried by the consumer.

Figure 2:
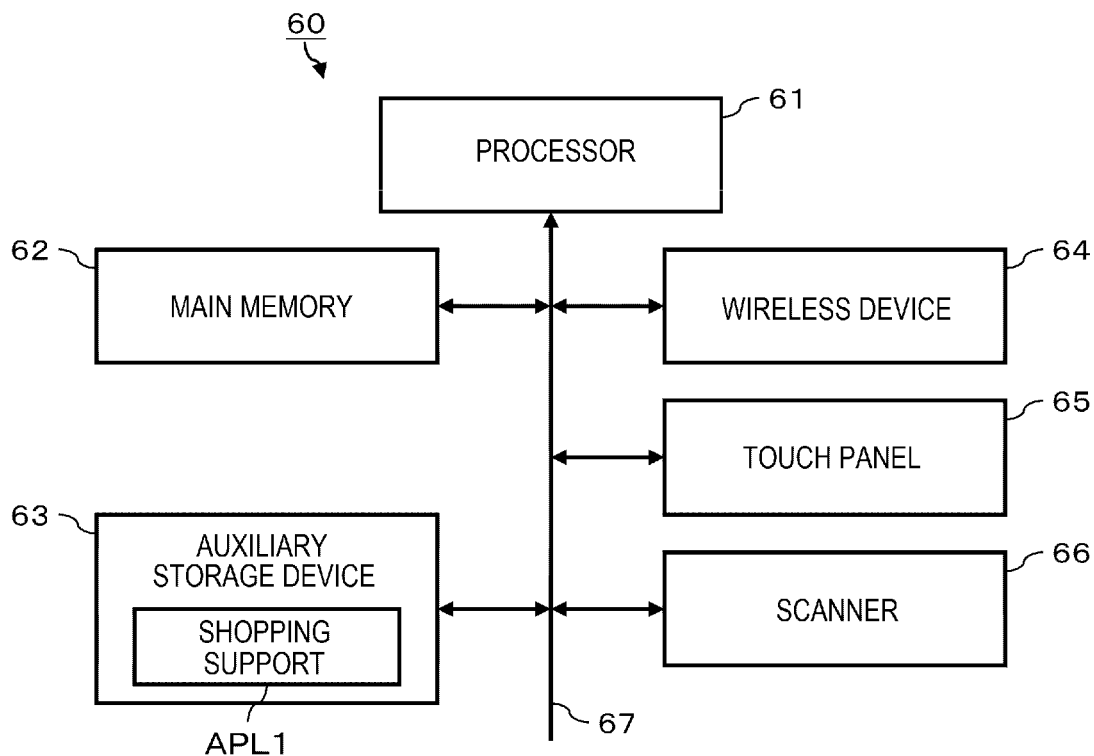
FIG. 2 is a block diagram illustrating a main part circuit configuration of a mobile terminal according to an embodiment.

FIG. 2 is a block diagram illustrating a circuit configuration of the mobile terminal 60. The mobile terminal 60 includes a processor 61, a main memory 62, an auxiliary storage device 63, a wireless device 64, a touch panel 65, a scanner 66, and a system transmission line 67. The system transmission line 67 includes an address bus, a data bus, and a control signal line. In the mobile terminal 60, the processor 61, the main memory 62, the auxiliary storage device 63, the wireless device 64, the touch panel 65, and the scanner 66 are connected to the system transmission line 67. The mobile terminal 60 is a computer configured by the processor 61, the main memory 62, and the auxiliary storage device 63 and the system transmission line 67 that connects the foregoing.

The processor 61 is equivalent to a central processing part of the computer. The processor 61 controls the units in order to realize various functions of the mobile terminal 60 according to an operating system or application programs. The processor 61 is, for example, a CPU (Central Processing Unit).

The main memory 62 is equivalent to a main storage part of the computer. The main memory 62 includes, for example, a nonvolatile memory region and a volatile memory region. The main memory 62 stores the operating system or the application programs in the nonvolatile memory region. The main memory 62 stores, in the volatile memory region, data necessary for the processor 61 in executing processing for controlling the units. The main memory 62 sometimes stores the data in the nonvolatile memory region. The main memory 62 uses the volatile memory region as a work area where data is rewritten as appropriate by the processor 61. The nonvolatile memory region is, for example, a ROM (Read Only Memory). The volatile memory region is, for example, a RAM (Random Access Memory).

The auxiliary storage device 63 is equivalent to an auxiliary storage part of the computer. The auxiliary storage device 63 may be an EEPROM (electric erasable programmable read-only memory), a HDD (hard disc drive), an SSD (solid state drive), or the like. The auxiliary storage device 63 saves data used by the processor 61 in performing various kinds of processing, data generated by the processing in the processor 61, or the like. The auxiliary storage device 63 sometimes stores the application programs.

The wireless device 64 is a device for performing wireless communication of data between the wireless device 64 and the access point 50 via the wireless LAN.

The touch panel 65 is a device functioning as both an input device and a display device of the mobile terminal 60. The touch panel 65 can display various images. The touch panel 65 can detect a touch position on a displayed image and output information concerning the touch position to the processor 61.

The scanner 66 is a device used for reading of a barcode. The scanner 66 may be a device that performs scanning with a laser beam and optically reads the barcode or may be a device that processes an image including the barcode photographed by a camera and reads the barcode.

In the mobile terminal 60, a shopping support program APL1 is installed in the auxiliary storage device 63 as an application program. A method of installing the shopping support program APL1 in the auxiliary storage device 63 is not particularly limited. The shopping support program APL1 can be recorded in a removable recording medium or can be distributed by communication via a network and installed in the auxiliary storage device 63. The recording medium may be any form provided the recording medium can store programs like a CD-ROM, a memory card, or the like and can be read by a device. An install destination of the shopping support program APL1 may be the main memory 62.

The monitoring terminal 70 is an electronic device for monitoring an operation state of the mobile terminal 60. The monitoring terminal 70 may monitor an operation state of the accounting machine 30 together with the operation state of the mobile terminal 60. Typically, a store clerk called attendant is an operator of the monitoring terminal 70. The monitoring terminal 70 is set up and used in a place where the attendant is on standby. The monitoring terminal 70 may be a portable electronic device that the attendant can take out. The monitoring terminal 70 is an example of a store terminal.

Figure 3:
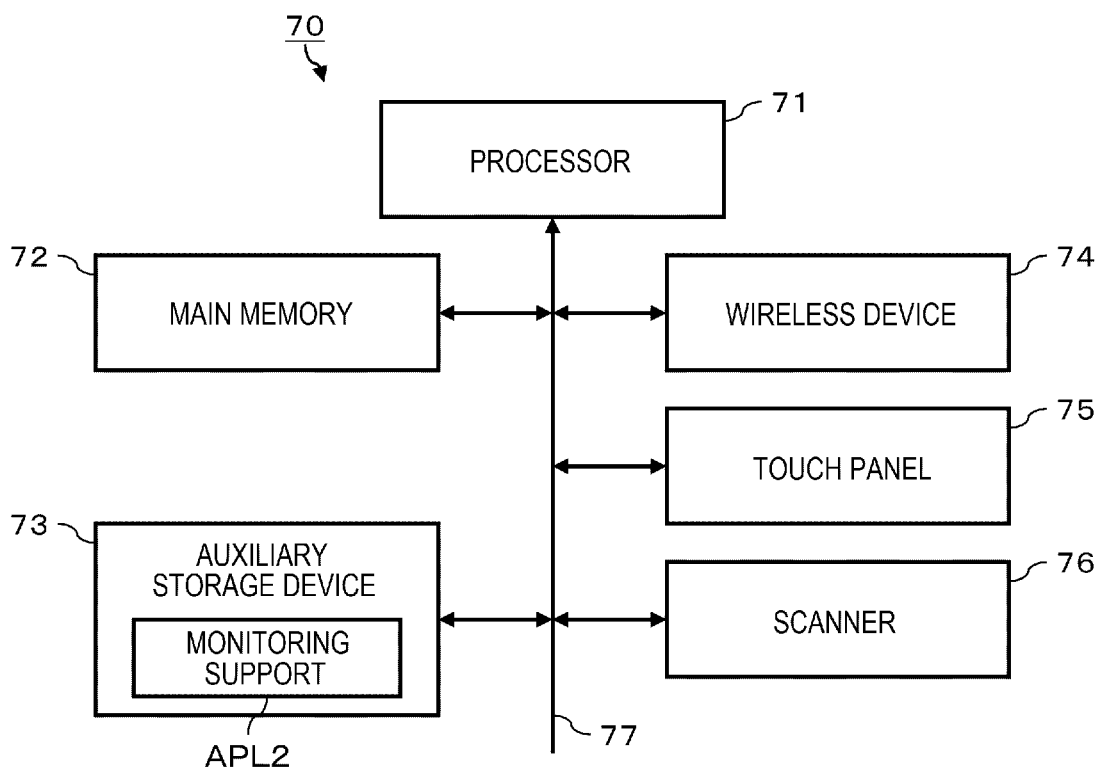
FIG. 3 is a block diagram illustrating a main part circuit configuration of a monitoring terminal according to an embodiment.

FIG. 3 is a block diagram illustrating a main part circuit configuration of the monitoring terminal 70. The monitoring terminal 70 includes a processor 71, a main memory 72, an auxiliary storage device 73, a wireless device 74, a touch panel 75, a scanner 76, and a system transmission line 77. The system transmission line 77 can include an address bus, a data bus, and a control signal line. In the monitoring terminal 70, the processor 71, the main memory 72, the auxiliary storage device 73, the wireless device 74, the touch panel 75, and the scanner 76 are connected to the system transmission line 77. In the monitoring terminal 70, a computer is configured by the processor 71, the main memory 72, and the auxiliary storage device 73 and the system transmission line 77 that connects the foregoing.

Description regarding the processor 71, the main memory 72, the auxiliary storage device 73, the wireless device 74, the touch panel 75, and the scanner 76 overlaps the description regarding the processor 61, the main memory 62, the auxiliary storage device 63, the wireless device 64, the touch panel 65, and the scanner 66 of the mobile terminal 60. Therefore, any overlapping description is omitted.

In the monitoring terminal 70, a monitoring support program APL2 is installed in the auxiliary storage device 73 as a kind of the application programs. A method of installing the monitoring support program APL2 in the auxiliary storage device 73 is not particularly limited either. A method equivalent to the method of installing the shopping support program APL1 can be directly applied. An install destination of the monitoring support program APL2 may be the main memory 72.

The accounting machine 30 is a terminal for settling a commercial transaction with a consumer. The accounting machine 30 acquires accounting data of the commercial transaction from the virtual POS server 20 and settles the commercial transaction based on the accounting data. The accounting machine 30 can settle the commercial transaction with a well-known settlement scheme such as cash settlement, credit card settlement, electronic money settlement, point settlement, or code settlement (also called mobile settlement or smartphone settlement).

As the accounting machine 30, a manned accounting machine to which a store clerk inputs information for settlement and a self-service accounting machine to which a consumer inputs information for settlement are provided. The store system 100 may include both the manned accounting machine and the self-service accounting machine or may include only one of the manned accounting machine or the self-service accounting machine. As the manned accounting machine, a conventional POS terminal can be applied. As the self-service accounting machine, a conventional self-service or semi-self-service accounting machine can be applied.

The store server 10 supports an overall store job. For the support, the store server 10 manages various databases such as a commodity database and a member database.

The commodity database is an aggregate of commodity records describing data of commodities sold in the store. The commodity record includes data items such as a commodity code, a commodity name, a price, and discount information. The commodity code is a unique identification code set for each of the commodities in order to individually identify the commodities. Barcodes indicating commodity codes are attached to the commodities. The discount information is information concerning a commodity discount such as a discount amount and a discount rate.

The member database is an aggregate of member records describing data concerning consumers who perform member registration as point members, so-called members. The member record includes data items such as a member code and a cumulative point. The member code is a unique identification code set for each of members in order to identify the members. The cumulative point is accumulated points given to a consumer, who is the member, in commercial transaction with the member.

The virtual POS server 20 cooperates with the mobile terminal 60 to perform as if a well-known POS terminal is operating. That is, the virtual POS server 20 performs registration processing for a purchased commodity based on data input from the touch panel 65 or the scanner 66 of the mobile terminal 60. The data of the purchased commodity subjected to the registration processing by the virtual POS server 20 is displayed on the touch panel 65 of the mobile terminal 60.

Figure 4:
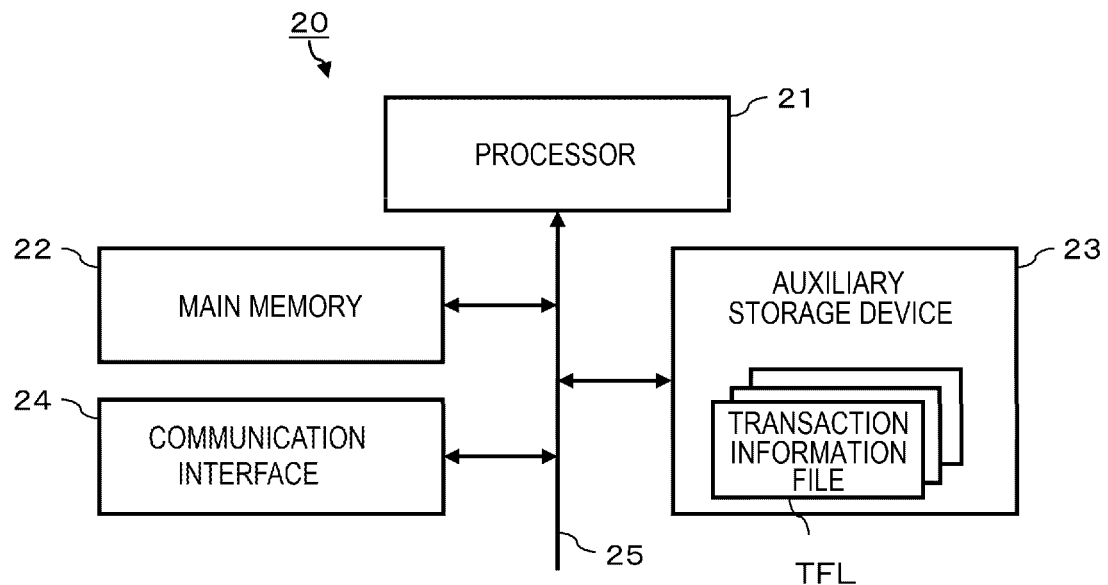
FIG. 4 is a block diagram illustrating a main part circuit configuration of a virtual point-of-sale (POS) server according to an embodiment.

FIG. 4 is a block diagram illustrating a circuit configuration of the virtual POS server 20, according to an embodiment. The virtual POS server 20 includes a processor 21, a main memory 22, an auxiliary storage device 23, a communication interface 24, and a system transmission line 25. The system transmission line 25 includes an address bus, a data bus, and a control signal line. In the virtual POS server 20, the processor 21, the main memory 22, the auxiliary storage device 23, and the communication interface 24 are connected to the system transmission line 25. In the virtual POS server 20, a computer is configured by the processor 21, the main memory 22, and the auxiliary storage device 23 and the system transmission line 25 that connects the forgoing.

Description of the processor 21, the main memory 22, and the auxiliary storage device 23 overlaps the description of the processor 61, the main memory 62, and the auxiliary storage device 63 of the mobile terminal 60. Therefore, any overlapping description is omitted.

The communication interface 24 is a circuit for performing data communication between the communication interface 24 and the units connected via the communication network 80.

In the virtual POS server 20 having such a configuration, a storage region for saving a plurality of transaction information files TFL is formed in the auxiliary storage device 23. A data structure of the transaction information files TFL is explained below.

The terminal controller 40 controls the operation of the mobile terminal 60 and the monitoring terminal 70 connected by the wireless LAN via the access point 50. The terminal controller 40 exchanges a data command between the terminal controller 40 and the mobile terminal 60, in which the shopping support program APL1 is executed, to thereby cause the mobile terminal 60 to function as an input and output interface of a POS terminal. The terminal controller 40 exchanges a data command between the terminal controller 40 and the monitoring terminal 70, in which the monitoring support program APL2 is executed, to thereby cause the monitoring terminal 70 to function as a state monitoring device of the mobile terminal 60.

Figure 5:
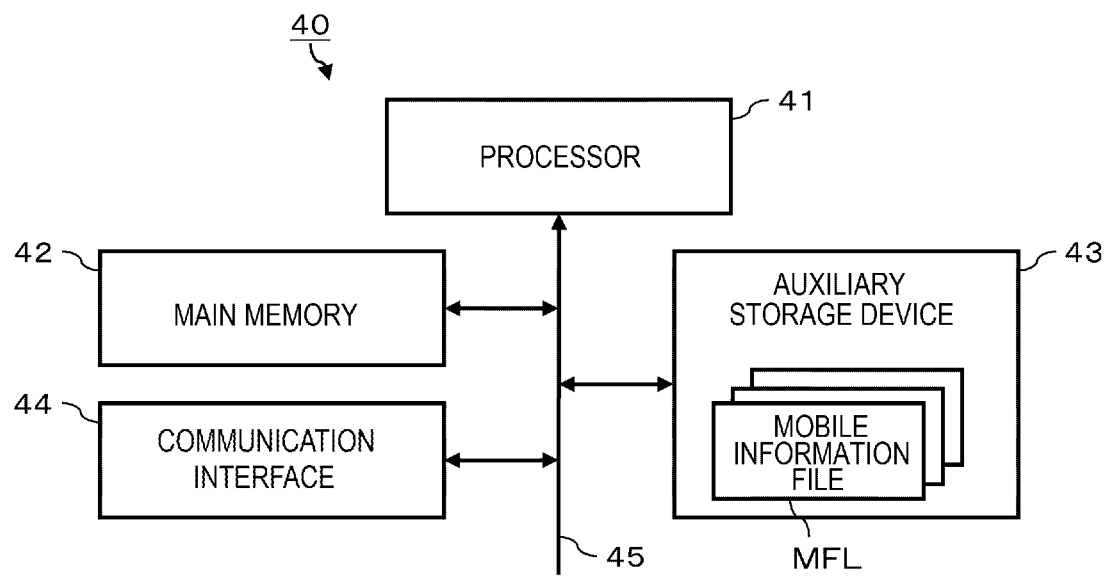
FIG. 5 is a block diagram illustrating a main part circuit configuration of a terminal controller according to an embodiment.

FIG. 5 is a block diagram illustrating a circuit configuration of the terminal controller 40 according to an embodiment. The terminal controller 40 includes a processor 41, a main memory 42, an auxiliary storage device 43, a communication interface 44, and a system transmission line 45. The system transmission line 45 includes an address bus, a data bus, and a control signal line. In the terminal controller 40, the processor 41, the main memory 42, the auxiliary storage device 43, and the communication interface 44 are connected to the system transmission line 45. In the terminal controller 40, a computer is configured by the processor 41, the main memory 42, and the auxiliary storage device 43 and the system transmission line 45 that connects the foregoing.

Description of the processor 41, the main memory 42, and the auxiliary storage device 43 overlaps the description of the processor 61, the main memory 62, and the auxiliary storage device 63 of the mobile terminal 60. Therefore, any overlapping description is omitted.

The communication interface 44 is a circuit for performing data communication between the communication interface 44 and the units connected via the communication network 80.

In the terminal controller 40 having such a configuration, a storage region for saving a plurality of mobile information files MFL is formed in the auxiliary storage device 23. A data structure of the mobile information files MFL is explained below.

Figure 6:
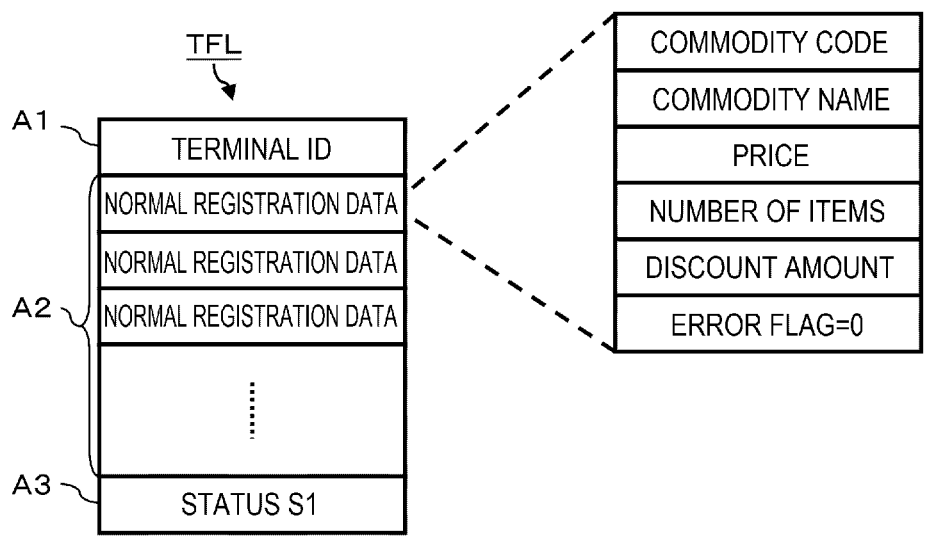
FIG. 6 is a schematic diagram illustrating a data structure of a transaction information file according to an embodiment.

FIG. 6 is a schematic diagram illustrating a data structure of the transaction information file TFL according to an embodiment. As illustrated in the embodiment of FIG. 6, the transaction information file TFL includes a region A1 for describing a terminal ID, a region A2 for storing a plurality of registration data, and a region A3 for storing a first status S1. The terminal ID is a unique code set in the main memory 62 or the auxiliary storage device 63 in order to individually identify the mobile terminals 60. The registration data is normal registration data. The normal registration data includes item data such as a commodity code, a commodity name, a price, the number of items, a discount amount, and an error flag. The error flag is "0". A first status S1 is information for identifying a state of the transaction information file TFL. As the state of the transaction information file TFL, a first state before a commodity registration start, a second state after the commodity registration start, a third state after an accounting declaration, and a fourth state after an accounting end are provided. In this embodiment, the first status S1 representing the first state is represented as "0", the first status S1 representing the second state is represented as "1", the first status S1 representing the third state is represented as "2", and the first status S1 representing the fourth state is represented as "3".

Figure 7:
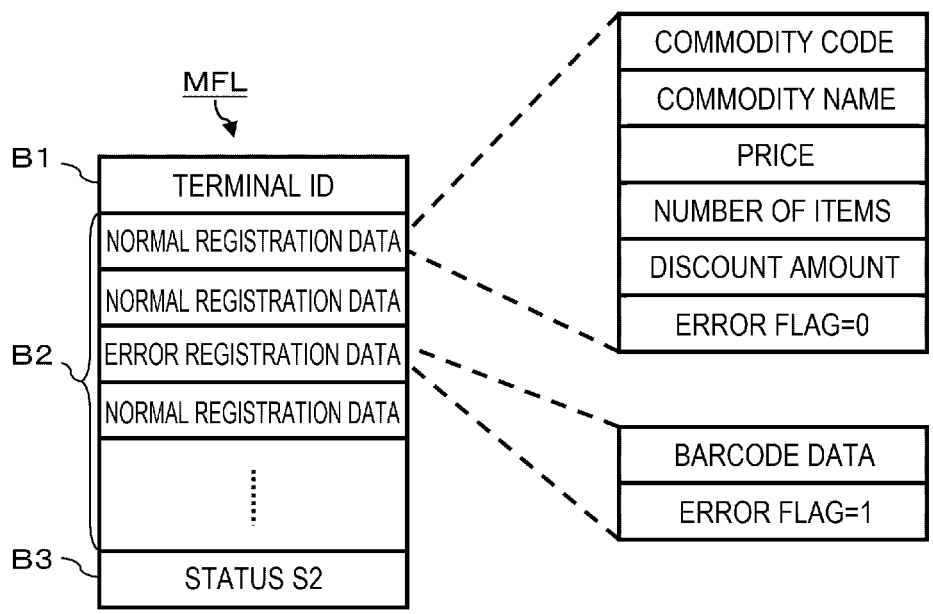
FIG. 7 is a schematic diagram illustrating a data structure of a mobile information file according to an embodiment.

FIG. 7 is a schematic diagram illustrating a data structure of the mobile information file MFL according to an embodiment. As illustrated in FIG. 7, the mobile information file MFL includes a region B1 for describing a terminal ID, a region B2 for storing a plurality of registration data, and a region B3 for storing a second status S2. The registration data includes error registration data other than the normal registration data. The error registration data includes item data such as barcode data and an error flag. The error flag is "1". The second status S2 is information for identifying a state of the mobile information file MFL. As the state of the mobile information file MFL, there are first, second, third and fourth states as in the transaction information file TFL. In this embodiment, the second status S2 representing the first state is represented as "0", the second status S2 representing the second state is represented as "1", the second status S2 representing the third state is represented as "2", and the second status S2 representing the fourth state is represented as "3".

Figure 8:
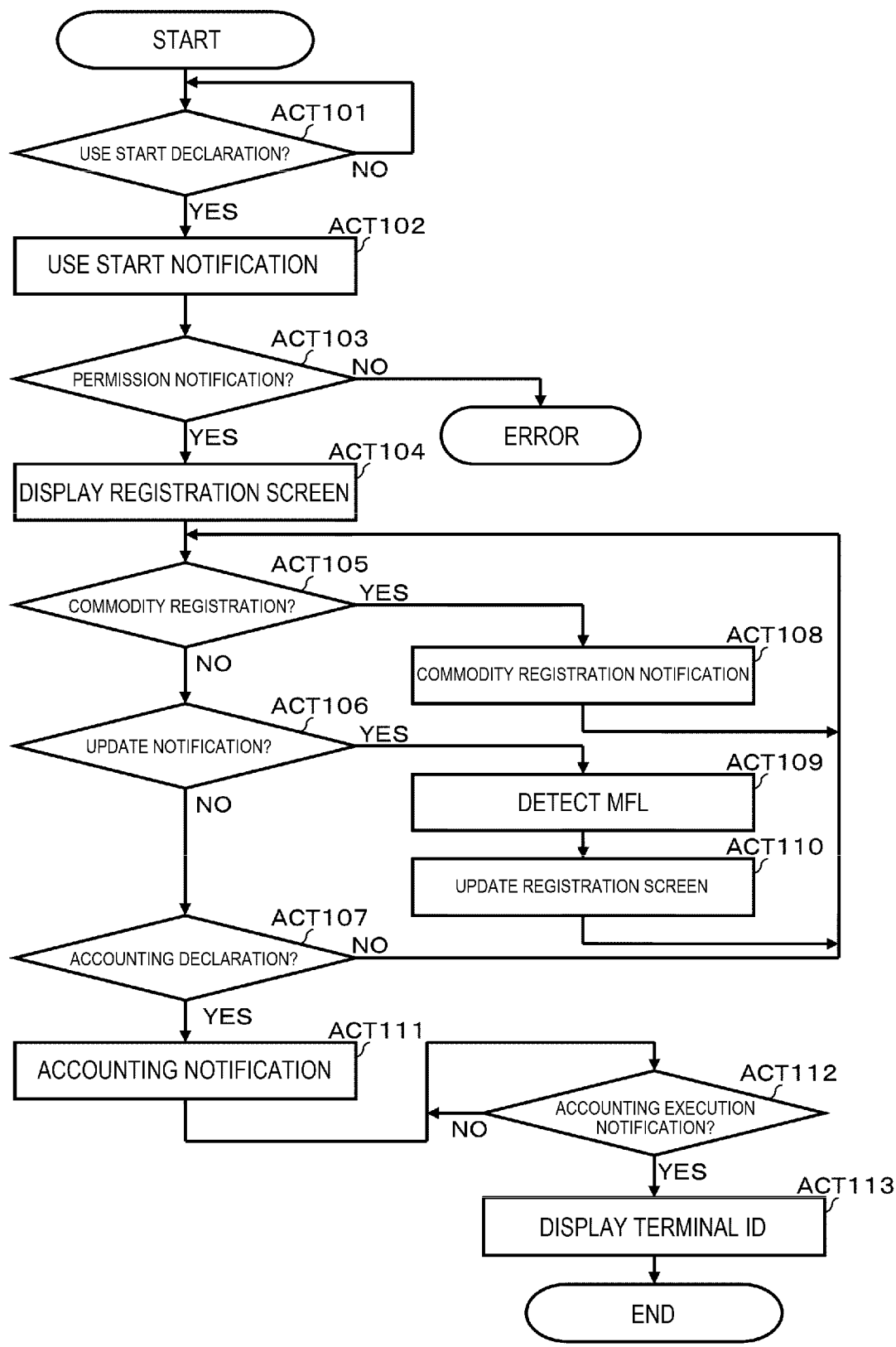
FIG. 8 is a flowchart illustrating a procedure of main information processing executed by a processor of the mobile terminal according to an embodiment.
Figure 9:
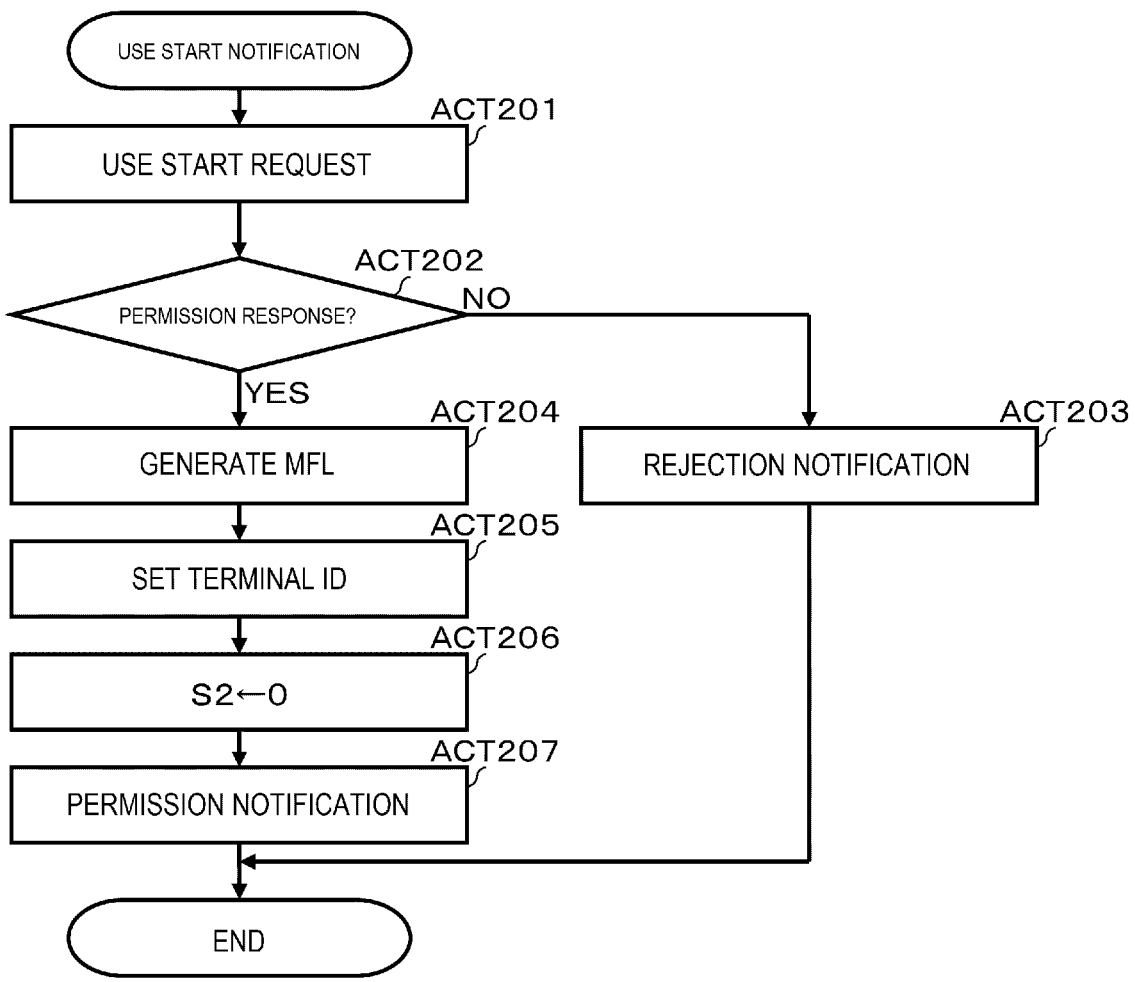
FIG. 9 is a flowchart illustrating a procedure of use start notification command reception processing executed by a processor of the terminal controller according to an embodiment.
Figure 10:
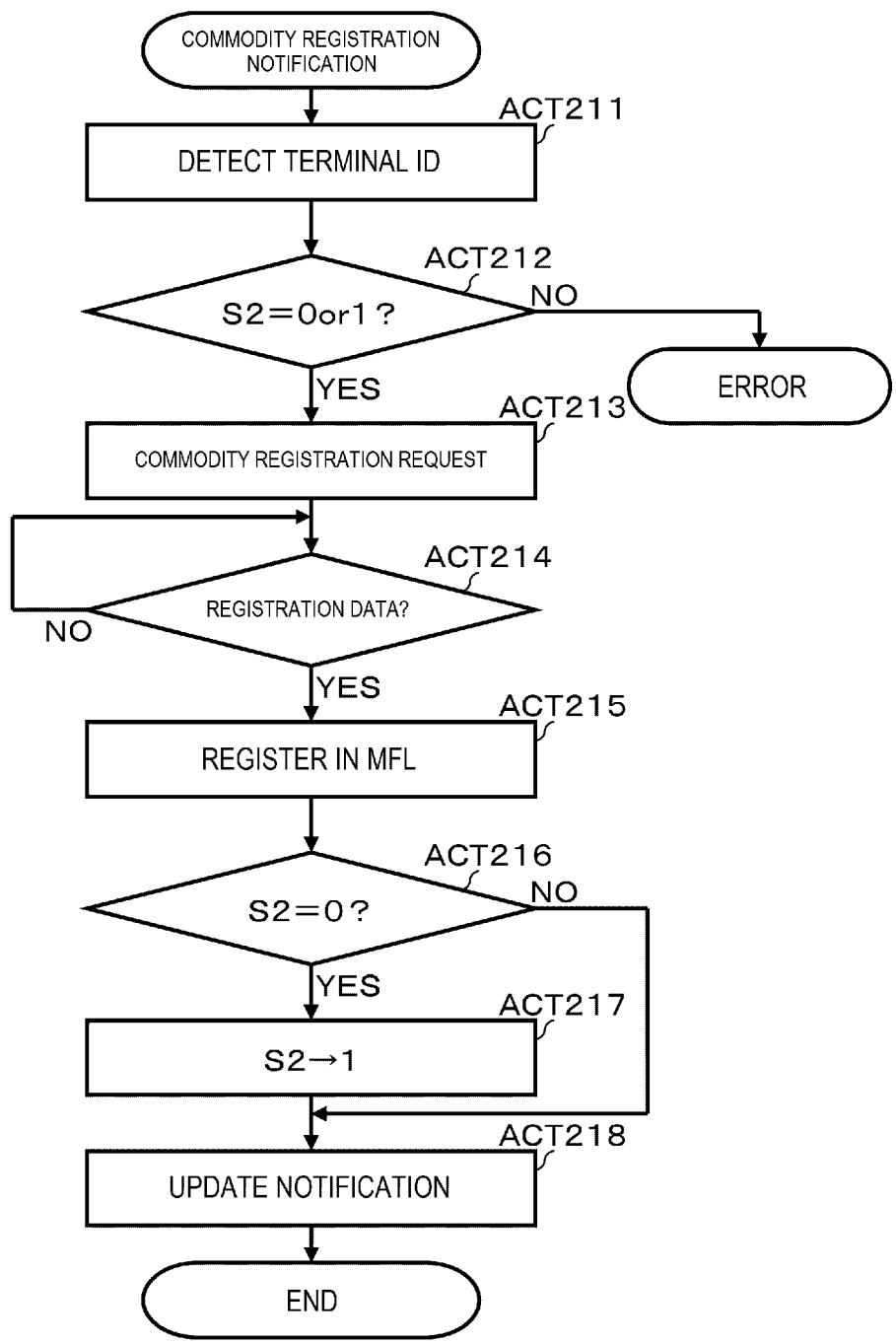
FIG. 10 is a flowchart illustrating a procedure of commodity registration notification command reception processing executed by the processor of the terminal controller according to an embodiment.
Figure 11:
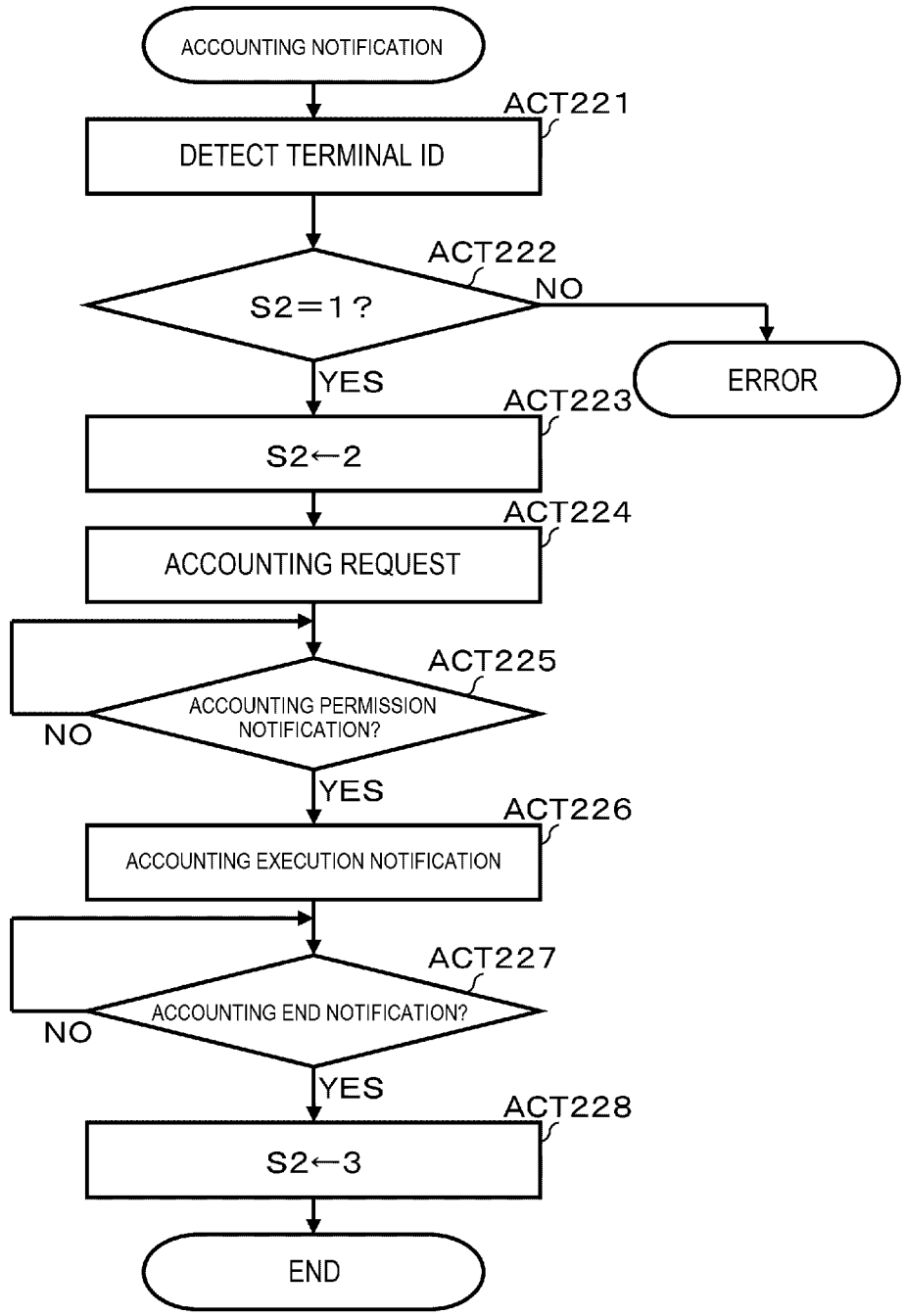
FIG. 11 is a flowchart illustrating a procedure of accounting notification command reception processing executed by the processor of the terminal controller according to an embodiment.
Figure 12:
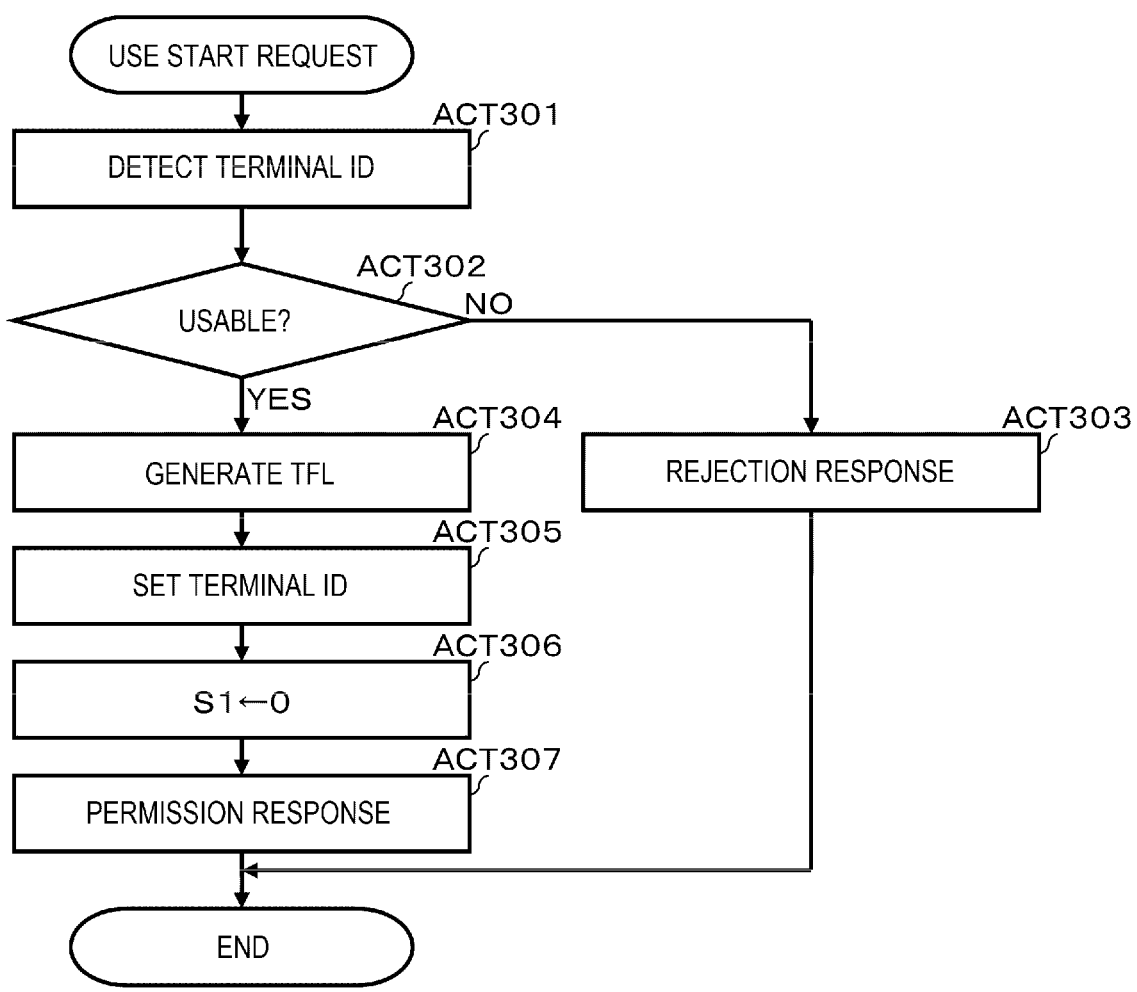
FIG. 12 is a flowchart illustrating a procedure of use start request command reception processing executed by a processor of the virtual POS server according to an embodiment.
Figure 13:
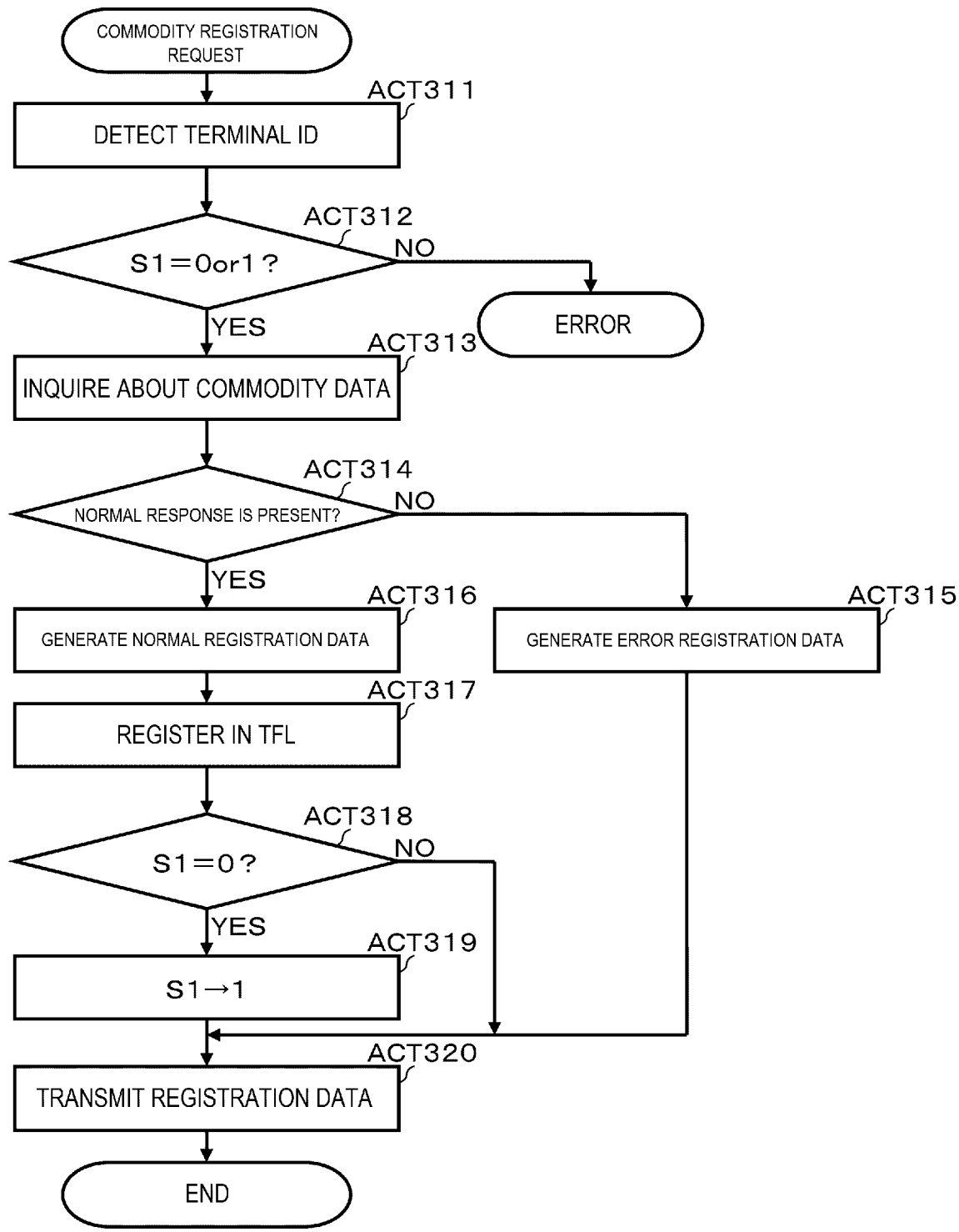
FIG. 13 is a flowchart illustrating a procedure of commodity registration request command reception processing executed by the processor of the virtual POS server according to an embodiment.
Figure 14:
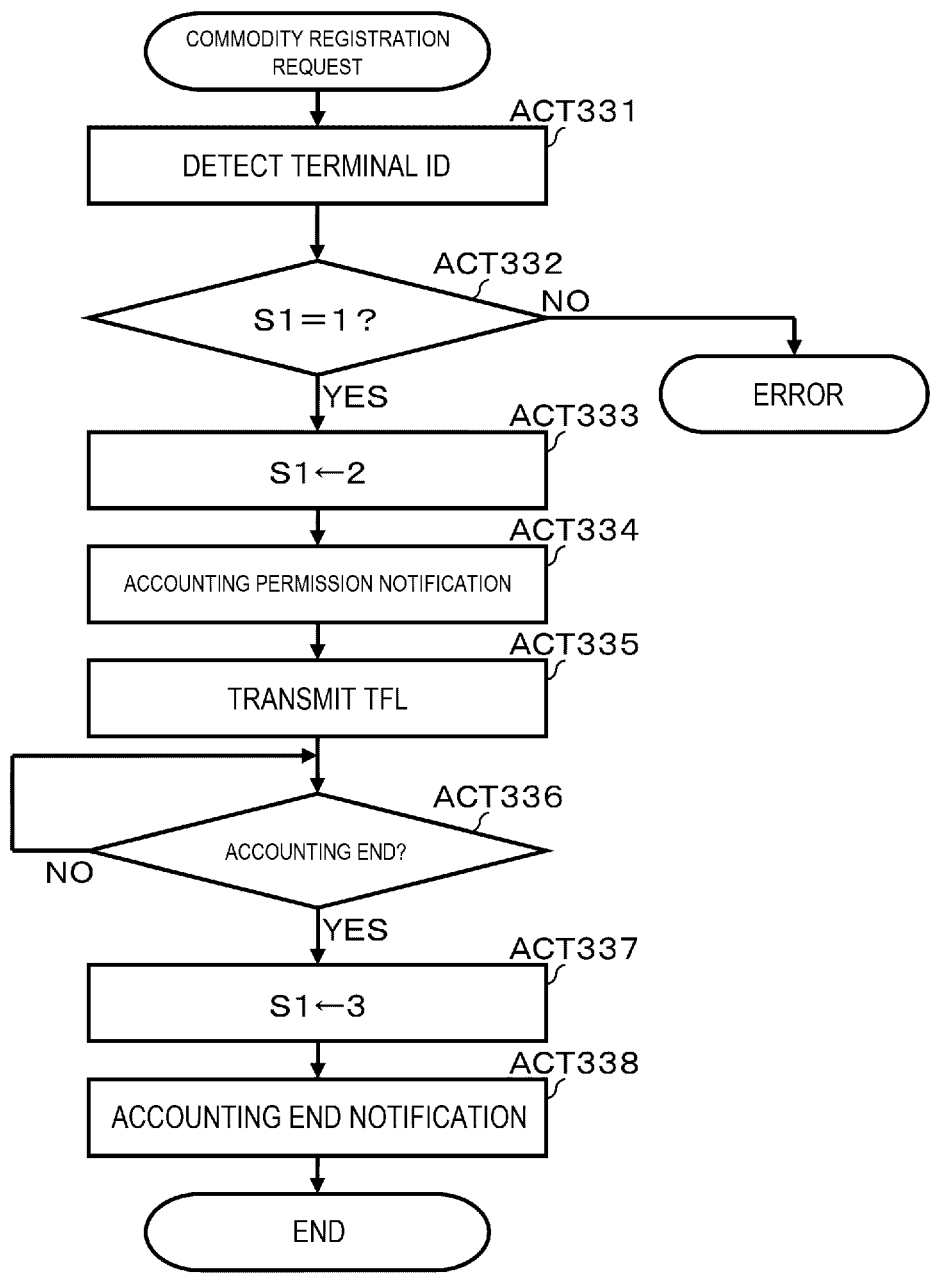
FIG. 14 is a flowchart illustrating a procedure of accounting request command reception processing executed by the processor of the virtual POS server according to an embodiment.

FIG. 8 is a flowchart illustrating a procedure of main information processing executed by the processor 61 of the mobile terminal 60 according to the shopping support program APL1. FIGS. 9 to 11 are flowcharts illustrating procedures of information processing executed by the processor 41 of the terminal controller 40 in response to the information processing of the mobile terminal 60. FIGS. 12 to 14 are flowcharts illustrating procedures of information processing executed by the processor 21 of the virtual POS server 20 in response to the information processing of the terminal controller 40. In the following explanation, the operation of the store system 100 from when a consumer inputs data based on a purchased commodity using the mobile terminal 60 until when the consumer ends accounting of the purchased commodity is explained with reference to these flowcharts. The operation explained below is an example. The procedures and the like are not particularly limited if the same result is obtained.

First, the consumer starts the mobile terminal 60 before beginning shopping. The mobile terminal 60 is attached to, for example, a shopping cart. If the mobile terminal 60 starts, the processor 61 starts the information processing of the procedure illustrated in the flowchart of FIG. 8. In ACT 101, the processor 61 waits for a use start declaration. For example, the processor 61 causes the touch panel 65 to display a shopping start button. The processor 61 waits for the shopping start button to be touched.

The consumer touches the shopping start button. In response to this touch input, the processor 61 determines YES in ACT 101 and proceeds to ACT 102. In ACT 102, the processor 61 controls the wireless device 64 to perform a use start notification. According to this control, a use start notification command is wirelessly transmitted from the wireless device 64. The use start notification command is received by the access point 50 connected by the wireless LAN and transmitted to the terminal controller 40 via the communication network 80. The use start notification command includes the terminal ID set in the mobile terminal 60.

If receiving the use start notification command via the communication interface 44, the processor 41 of the terminal controller 40 starts the information processing of the procedure illustrated in the flowchart of FIG. 9. In ACT 201, the processor 41 controls the communication interface 44 to perform a use start request. According to this control, a use start request command is output from the communication interface 44. The use start request command is transmitted to the virtual POS server 20 via the communication network 80. The use start request command includes the terminal ID detected from the use start notification command.

If receiving the use start request command via the communication interface 24, the processor 21 of the virtual POS server 20 starts the information processing of the procedure illustrated in the flowchart of FIG. 12. In ACT 301, the processor 21 detects the terminal ID from the use start request command. In ACT 302, the processor 21 determines usability of the mobile terminal 60 identified by the terminal ID.

Specifically, the processor 21 detects, among the transaction information files TFL, the transaction information file TFL in which the terminal ID is set in the region A1 and the first status S1 is other than "3". The transaction information file TFL in which the first status S1 is other than "3" corresponds to the mobile terminal 60 in which the use start declaration is performed but accounting does not end. Therefore, if detecting the relevant transaction information file TFL, the processor 21 determines that the mobile terminal 60 is unusable. If failing in detecting the relevant transaction information file TFL, the processor 2/ determines that the mobile terminal 60 is usable.

If determining that the mobile terminal 60 is unusable, the processor 21 determines NO in ACT 302 and proceeds to ACT 303. In ACT 303, the processor 21 controls the communication interface 24 to perform a rejection response.

If determining that the mobile terminal 60 is usable, the processor 21 determines YES in ACT 302 and proceeds to ACT 304. In ACT 304, the processor 21 creates the transaction information file TFL in the auxiliary storage device 23. In ACT 305, the processor 21 sets, in the region A1 of the transaction information file TFL, the terminal ID detected from the use start request command. In ACT 306, the processor 21 sets the first status S1 of the transaction information file TFL to "0". Further, in ACT 307, the processor 21 controls the communication interface 24 to perform a permission response.

According to the control in ACT 303 or ACT 307, the rejection response command or the permission response command is output from the communication interface 24. The rejection response command or the permission response command is transmitted to the terminal controller 40 via the communication network 80. The rejection response command or the permission response command includes the terminal ID detected from the use start request command.

Referring back to FIG. 9, in ACT 202, the processor 41 of the terminal controller 40, which performs the use start request, waits for the permission response command. If receiving the rejection response command via the communication interface 44, the processor 41 determines NO in ACT 202 and proceeds to ACT 203. In ACT 203, the processor 41 controls the communication interface 44 to perform a rejection notification.

On the other hand, if receiving the permission response command, the processor 41 determines YES in ACT 202 and proceeds to ACT 204. In ACT 204, the processor 41 creates the mobile information file MFL in the auxiliary storage device 43. In ACT 205, the processor 41 sets the terminal ID detected from the permission response command in the region B1 of the mobile information file MFL. In ACT 206, the processor 41 sets the second status S2 of the mobile information file MFL to "0". Further, in ACT 207, the processor 41 controls the communication interface 44 to perform a permission notification.

According to the control in ACT 203 or ACT 207, a rejection notification command or a permission notification command is output from the communication interface 44. The rejection notification command or the permission notification command is wirelessly transmitted from the access point 50 via the communication network 80. The rejection notification command or the permission notification command includes the terminal ID detected from the rejection response command or the permission response command. The rejection notification command or the permission notification command wirelessly transmitted from the access point 50 is received by the mobile terminal 60 in which the terminal ID included in the command is set.

Referring back to FIG. 8, in ACT 103, the processor 61 of the mobile terminal 60, which performs the use start notification, waits for the permission notification command. If receiving the rejection notification command via the wireless device 64, the processor 61 determines NO in ACT 103. The processor 61 determines that the processing for the use start declaration determining is an error and ends the processing. Therefore, the consumer cannot use the mobile terminal 60. For example, the consumer replaces the shopping cart and performs a use start declaration in the mobile terminal 60 of a cart after the replacement.

On the other hand, if receiving the permission notification command, the processor 61 determines YES in ACT 103 and proceeds to ACT 104. In ACT 104, the processor 61 causes the touch panel 65 to display a registration screen. The registration screen includes a details region for displaying a commodity name, a price, the number of items, a discount amount, and the like of a purchased commodity and a total region for displaying a total number of items, a total amount, and the like of purchased commodities. An accounting button for the consumer to declare a shift to accounting is also displayed on the registration screen. The accounting button is an example of an operator reproduced on a screen of the touch panel 65 by software. A layout of the registration screen is not particularly limited.

In ACT 105, the processor 61 of the mobile terminal 60, which displays the registration screen, determines whether commodity registration is received. If not receiving the commodity registration, the processor 61 determines NO in ACT 105 and proceeds to ACT 106. In ACT 106, the processor 61 confirms whether an update notification command is received. If not receiving the update notification command, the processor 61 determines NO in ACT 106 and proceeds to ACT 107. In ACT 107, the processor 61 confirms whether an accounting declaration is received. If not receiving the accounting declaration, the processor 61 determines NO in ACT 107 and returns to ACT 105. In ACT 105 to ACT 107, the processor 61 waits for the commodity registration to be performed, the update notification command to be received, or the accounting declaration to be performed.

The consumer confirming the registration screen causes, every time the consumer picks up a purchased commodity on a selling floor, the scanner 66 to read a barcode of the purchased commodity and then puts the purchased commodity in the shopping cart.

If the barcode is read by the scanner 66, the processor 61 in the waiting state in ACT 105 to ACT 107 determines that commodity registration is present. The processor 61 determines YES in ACT 105 and proceeds to ACT 108. In ACT 108, the processor 61 controls the wireless device 64 to perform a commodity registration notification. According to this control, the commodity registration notification command is wirelessly transmitted from the wireless device 64. The commodity registration notification command is transmitted to the terminal controller 40 via the access point 50. The commodity registration notification command includes data of the barcode read by the scanner 66 and the terminal ID of the mobile terminal 60.

If receiving the commodity registration notification command via the communication interface 44, the processor 41 of the terminal controller 40 starts the information processing of the procedure illustrated in the flowchart of FIG. 10. In ACT 211, the processor 41 detects the terminal ID from the commodity registration notification command. In ACT 212, the processor 41 confirms whether the second status S2 of the mobile information file MFL in which the terminal ID is set is "0" or "1". If the second status S2 of the mobile information file MFL is other than "0" or "1", the processor 41 determines NO in ACT 212. The processor 41 determines that the processing for the commodity registration notification is an error and ends the processing.

If the second status S2 of the mobile information file MFL is "0" or "1", the processor 41 determines YES in ACT 212 and proceeds to ACT 213. In ACT 213, the processor 41 controls the communication interface 44 to perform a commodity registration request. According to this control, a commodity registration request command is output from the communication interface 44. The commodity registration request command is transmitted to the virtual POS server 20 via the communication network 80. The commodity registration request command includes the data of the barcode and the terminal ID detected from the commodity registration notification command. In the following explanation, the mobile information file MFL in which the second status S2 is "0" or "1" is referred to as registration mobile information file MFL1.

If receiving the commodity registration request command via the communication interface 24, the processor 21 of the virtual POS server 20 starts the information processing of the procedure illustrated in the flowchart of FIG. 13. In ACT 311, the processor 21 detects the terminal ID from the commodity registration request command. In ACT 312, the processor 21 confirms whether the first status S1 of the transaction information file TFL in which the terminal ID is set is "0" or "1". If the first status S1 of the transaction information file TFL is other than "0" or "1", the processor 21 determines NO in ACT 312. In other words, the processor 21 determines that the processing for the commodity registration request is an error and ends the processing.

If the first status S1 of the transaction information file TFL is "0" or "1", the processor 21 determines YES in ACT 312 and proceeds to ACT 313. In ACT 313, the processor 21 queries the store server 10 for commodity data using the data of the barcode detected from the commodity registration request command. In the following explanation, the transaction information file TFL in which the first status S1 is "0" or "1" is referred to as registration transaction information file TFL1.

In response to the inquiry about the commodity data, a processor of the store server 10 confirms whether the data of the barcode is a commodity code. If the data of the barcode is a commodity code, the processor searches through the commodity database using the commodity code. If detecting a commodity record including the commodity code, the processor 11 transmits a normal response command to the virtual POS server 20. The normal response command includes commodity data such as a commodity code, a commodity name, a price, and discount information forming the commodity record.

On the other hand, although the commodity database is searched through, if failing to detect the relevant commodity record or if the data of the barcode is not a commodity code, the processor transmits an error response command to the virtual POS server 20. In some case, for example, a barcode for identifying a producer, a manufacturing company, or the like is attached to the commodity other than a barcode of a commodity code. If the consumer erroneously reads such a barcode, the processor transmits an error response command to the virtual POS server 20. The error response command includes the data of the barcode detected from the commodity registration request command.

In ACT 314, the processor 21 of the virtual POS server 20, which inquires about the commodity data, waits for the normal response command. If receiving the error response command via the communication interface 24, the processor 21 determines NO in ACT 314 and proceeds to ACT 315. In ACT 315, the processor 21 generates error registration data. The error registration data includes the data of the barcode detected from the error response command and an error flag of "1". After generating the error registration data, the processor 21 proceeds to ACT 320. Processing in ACT 320 is explained below.

On the other hand, if receiving the normal response command via the communication interface 24, the processor 21 determines YES in ACT 314 and proceeds to ACT 316. In ACT 316, the processor 21 generates normal registration data. The normal registration data includes the commodity data detected from the normal response command and an error flag of "0".

After generating the normal registration data, in ACT 317, the processor 21 registers the normal registration data in the registration transaction information file TFL1. In ACT 318, the processor 21 confirms whether the first status S1 of the registration transaction information file TFL1 is "0". If the first status S1 is "0", the processor 21 determines YES in ACT 318 and proceeds to ACT 319. In ACT 319, the processor 21 changes the first status S1 from "0" to "1". If the first status S1 is already changed to "1", the processor 21 determines NO in ACT 318 and skips the processing in ACT 319.

If ending the processing in ACT 319 or skipping the processing in ACT 319, the processor 21 proceeds to ACT 320. In ACT 320, the processor 21 controls the communication interface 24 to transmit the registration data to the terminal controller 40. According to this control, the normal registration data or the error registration data is output from the communication interface 24. The normal registration data or the error registration data is transmitted to the terminal controller 40 via the communication network 80.

Referring back to FIG. 10, in ACT 214, the processor 41 of the terminal controller 40, which transmits the commodity registration request command, waits for the registration data. If receiving the normal registration data or the error registration data via the communication interface 44, the processor 41 determines YES in ACT 214 and proceeds to ACT 215. In ACT 215, the processor 41 registers the normal registration data or the error registration data in the registration mobile information file MFL1. In ACT 216, the processor 41 confirms whether the second status S2 of the registration mobile information file MFL1 is "0". If the second status S2 is "0", the processor 41 determines YES in ACT 216 and proceeds to ACT 217. In ACT 217, the processor 21 changes the second status S2 from "0" to "1". If the second status S2 is already changed to "1", the processor 41 determines NO in ACT 216 and skips the processing in ACT 217.

If ending the processing in ACT 217 or skipping the processing in ACT 217, the processor 41 proceeds to ACT 218. In ACT 218, the processor 21 controls the communication interface 24 to transmit the update notification command. According to this control, the update notification command is output from the communication interface 24. The update notification command is wirelessly transmitted from the access point 50 via the communication network 80. The update notification command includes the data of the registration mobile information file MFL1 and the terminal ID detected from the commodity registration notification command. The update notification command wirelessly transmitted from the access point 50 is received by the mobile terminal 60 in which the terminal ID included in the command is set.

Referring back to FIG. 8, the processor 61 of the mobile terminal 60, which controls the transmission of the commodity registration notification command, returns to the waiting state in ACT 105 to ACT 107. In this waiting state, if receiving the update notification command via the wireless device 64, the processor 61 determines YES in ACT 106 and proceeds to ACT 109. In ACT 109, the processor 61 detects the data of the mobile information file MFL from the update notification command. In ACT 110, the processor 61 updates the registration screen based on the data. That is, concerning the normal registration data, the processor 61 updates the registration screen such that the commodity name, the price, the number of items, the discount amount, and the like are displayed in the details region. The processor 61 also updates the total number of items and the total amount in the total region. Concerning the error registration data, the processor 61 updates the registration screen such that data indicating error content is displayed in the details region. The processor 61 finishing updating the registration screen in this way returns to the waiting state in ACT 105 to ACT 107.

In this way, the consumer doing shopping using the mobile terminal 60 starts the mobile terminal 60 first. Then, in the virtual POS server 20, the transaction information file TFL in which the terminal ID of the mobile terminal 60 is set is created. In the terminal controller 40, the mobile information file MFL in which the terminal ID is set is created.

Subsequently, the consumer reads a barcode of a purchased commodity with the scanner 66 of the mobile terminal 60. Then, data of the barcode is transmitted to the virtual POS server 20 via the terminal controller 40. If the barcode data indicates a commodity code of the purchased commodity, in the virtual POS server 20, normal registration data relating to the purchased commodity is generated. The normal registration data is stored in the transaction information file TFL. On the other hand, for example, if the barcode data does not indicate the commodity code of the purchased commodity, in the virtual POS server 20, error registration data is generated. The error registration data is not stored in the transaction information file TFL.

The normal registration data or the error registration data generated in the virtual POS server 20 is transmitted to the terminal controller 40. In the terminal controller 40, the normal registration data and the error registration data is stored in the mobile information file MFL. The data of the mobile information file MFL is transmitted to the mobile terminal 60. In the mobile terminal 60, a list of registration data stored in the mobile information file MFL is displayed on the touch panel 65.

Therefore, the consumer can confirm a price, a discount amount, and the like of the purchased commodity from the list displayed on the touch panel 65. The consumer can also confirm that a registration error occurs.

If there is no problem in the price, the discount amount, and the like of the purchased commodity and a registration error does not occur, the consumer touches the accounting button on the registration screen when finishing the shopping. If the accounting button is touched, the processor 61 of the mobile terminal 60 determines YES in ACT 107 and proceeds to ACT 111. In ACT 111, the processor 61 controls the wireless device 64 to perform an accounting notification. According to this control, an accounting notification command is wirelessly transmitted from the wireless device 64. The accounting notification command is transmitted to the terminal controller 40 via the access point 50. The accounting notification command includes the terminal ID of the mobile terminal 60.

If receiving the accounting notification command via the communication interface 44, the processor 41 of the terminal controller 40 stars the information processing of the procedure illustrated in the flowchart of FIG. 11. In ACT 221, the processor 41 detects the terminal ID from the accounting notification command. In ACT 222, the processor 41 confirms whether the second status S2 of the mobile information file MFL in which the terminal ID is set is "1". If the second status S2 of the mobile information file MFL is other than "1", the processor 41 determines NO in ACT 222. The processor 41 determines the processing for the accounting notification is an error and ends the processing.

If the second status S2 of the mobile information file MFL is "1", the processor 41 determines YES in ACT 222 and proceeds to ACT 223. The processor 41 changes the second status S2 of the mobile information file MEL from "1" to "2". In ACT 224, the processor 41 controls the communication interface 44 to perform an accounting request. According to this control, an accounting request command is output from the communication interface 44. The accounting request command is transmitted to the virtual POS server 20 via the communication network 80. The accounting request command includes the terminal ID detected from the accounting notification command. In the following explanation, the mobile information file MFL in which the second status S2 is changed from "1" to "2" is referred to as accounting mobile information file MFL2.

If receiving the accounting request command via the communication interface 24, the processor 21 of the virtual POS server 20 starts the information processing of the procedure illustrated in the flowchart of FIG. 14. In ACT 331, the processor 21 detects the terminal ID from the accounting request command. In ACT 332, the processor 21 confirms whether the first status S1 of the transaction information file TFL in which the terminal ID is set is "1". If the first status S1 of the transaction information file TFL is other than "1", the processor 21 determines NO in ACT 332. The processor 21 determines that the processing for the accounting request is an error and ends the processing.

If the first status S1 of the transaction information file TFL is "1", the processor 21 determines YES in ACT 332 and proceeds to ACT 333. In ACT 333, the processor 21 changes the first status S1 of the transaction information file TFL from "1" to "2". In the following explanation, the transaction information file TFL in which the first status S1 is changed from "1" to "2" is referred to as accounting transaction information file TFL2.

In ACT 334, the processor 21 controls the communication interface 24 to perform an accounting permission notification. According to this control, an accounting permission notification command is output from the communication interface 24. The accounting permission notification command is transmitted to the terminal controller 40 via the communication network 80. The accounting permission notification command includes the terminal ID detected from the accounting request command.

Referring back to FIG. 11, in ACT 225, the processor 41 of the terminal controller 40, which transmits the accounting request command, waits for the accounting permission notification command. If receiving the accounting permission notification command via the communication interface 44, the processor 41 determines YES in ACT 225 and proceeds to ACT 226. In ACT 226, the processor 41 controls the communication interface 24 to perform an accounting execution notification. According to this control, an accounting execution notification command is output from the communication interface 24. The accounting execution notification command is wirelessly transmitted from the access point 50 via the communication network 80. The accounting execution notification command includes the terminal ID detected from the accounting notification command. The accounting execution notification command wirelessly transmitted from the access point 50 is received by the mobile terminal 60 in which the terminal ID included in the command is set.

Referring back to FIG. 8, in ACT 112, the processor 61 of the mobile terminal 60, which performs the accounting notification, waits for the accounting execution notification. If receiving the accounting execution notification command via the wireless device 64, the processor 61 determines YES in ACT 112 and proceeds to ACT 113. In ACT 113, the processor 61 causes the touch panel 65 to display a barcode indicating the terminal ID. The processor 61 ends the information processing for the use start declaration.

The consumer confirming that the barcode is displayed on the touch panel 65 faces the accounting machine 30. The consumer causes a scanner provided in the accounting machine 30 to read the barcode displayed on the touch panel 65. Data of the barcode read by the accounting machine 30 is output to the store server 10.

Referring back to FIG. 14, in ACT 335, the processor 21 of the virtual POS server 20, which transmits the accounting permission notification command, controls the communication interface 24 to transmit data of the accounting transaction information file TFL2 to the store server 10. According to this control, the data of the accounting transaction information file TFL2 is output from the communication interface 24. The data is transmitted to the store server 10 via the communication network 80.

The store server 10 temporarily saves the data of the accounting transaction information file TFL2 received from the virtual POS server 20. If acquiring the data of the barcode from the accounting machine 30, the store server 10 searches through the accounting transaction information file TFL2 in which the terminal ID represented by the barcode is set. The store server 10 outputs relevant data of the accounting transaction information file TFL2 to the accounting machine 30. The accounting machine 30 executes, based on the data of the accounting transaction information file TFL2, settlement processing for commodities purchased by the consumer. If the settlement processing in the accounting machine 30 ends, the store server 10 outputs an accounting end command to the virtual POS server 20.

In ACT 336, the processor 21 waits for the accounting end command. If receiving the accounting end command via the communication interface 24, the processor 21 determines YES in ACT 336 and proceeds to ACT 337. In ACT 337, the processor 21 changes the first status S1 of the accounting transaction information file TFL2 from "2" to "3". In ACT 338, the processor 21 controls the communication interface 24 to perform an accounting end notification. According to this control, an accounting end notification command is output from the communication interface 24. The accounting end notification command is transmitted to the terminal controller 40 via the communication network 80. The accounting end notification command includes the terminal ID detected from the accounting request command.

Referring back to FIG. 11, in ACT 227, the processor 41 of the terminal controller 40, which performs the accounting execution notification, waits for the accounting end notification command. If receiving the accounting end notification command via the communication interface 44, the processor 41 determines YES in ACT 227 and proceeds to ACT 228. In ACT 228, the processor 41 changes the second status S2 of the accounting mobile information file MFL2 from "2" to "3". The processor 41 ends the reception processing for the accounting notification command.

In this way, if there is no problem in the price, the discount amount, and the like of the purchase commodity and a registration error does not occur, by causing the scanner of the accounting machine 30 to read the barcode displayed on the touch panel 65 of the mobile terminal 60, the consumer can perform settlement of the purchased commodity using the accounting machine 30.

However, if the consumer notices that the price of the purchased commodity is different from a price tag or notices that the discount amount is different, in most cases, before accounting, the consumer reports to a store clerk called attendant. If a registration error occurs, the consumer acts the same. The store clerk receiving such a report corrects an error of the registration data using the monitoring terminal 70. Therefore, operation in correcting an error of the registration data using the monitoring terminal 70 is explained with reference to FIGS. 15 to 23.

Figure 15:
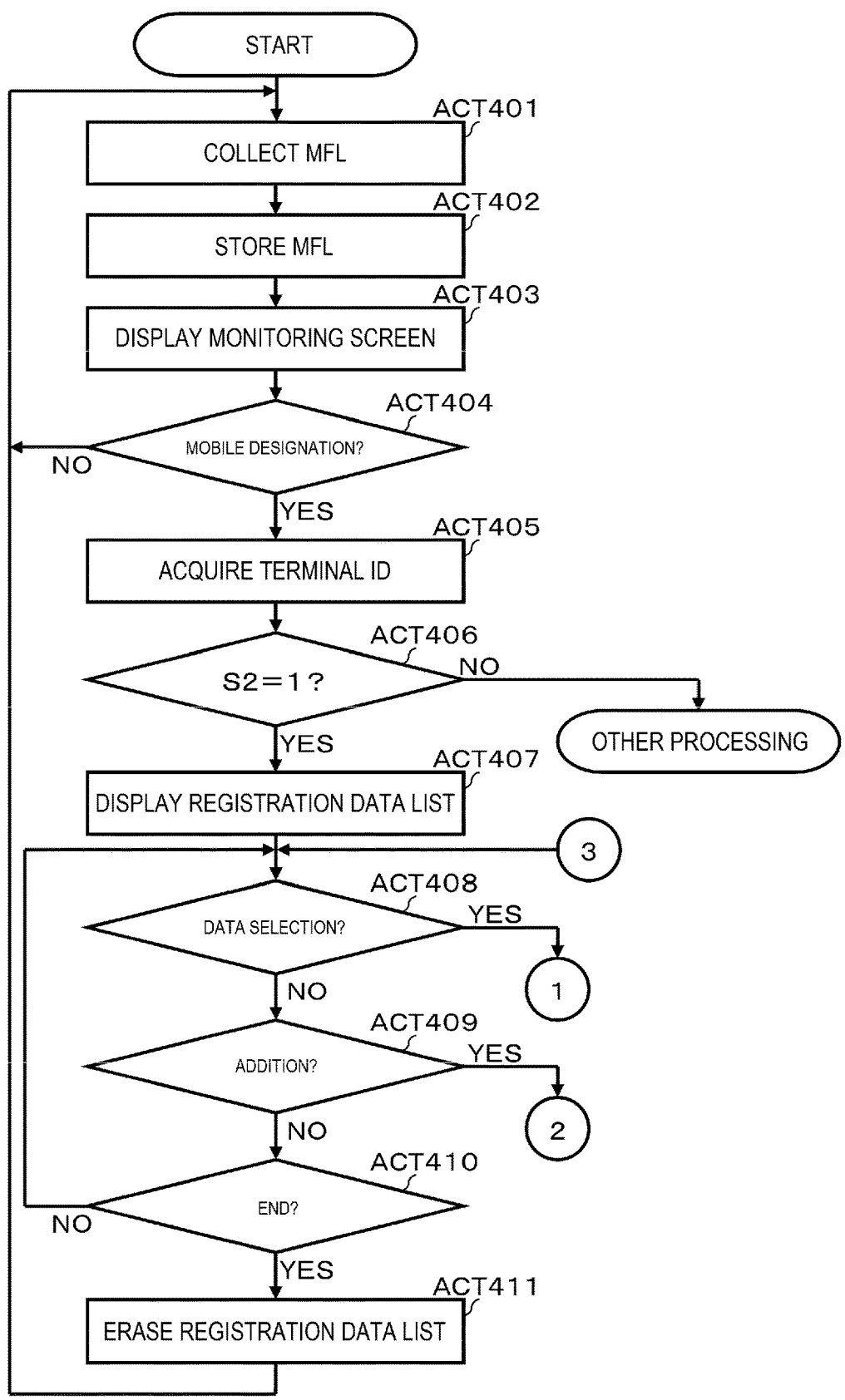
FIG. 15 is a flowchart illustrating a procedure of main information processing executed by a processor of a monitoring terminal according to an embodiment.
Figure 16:
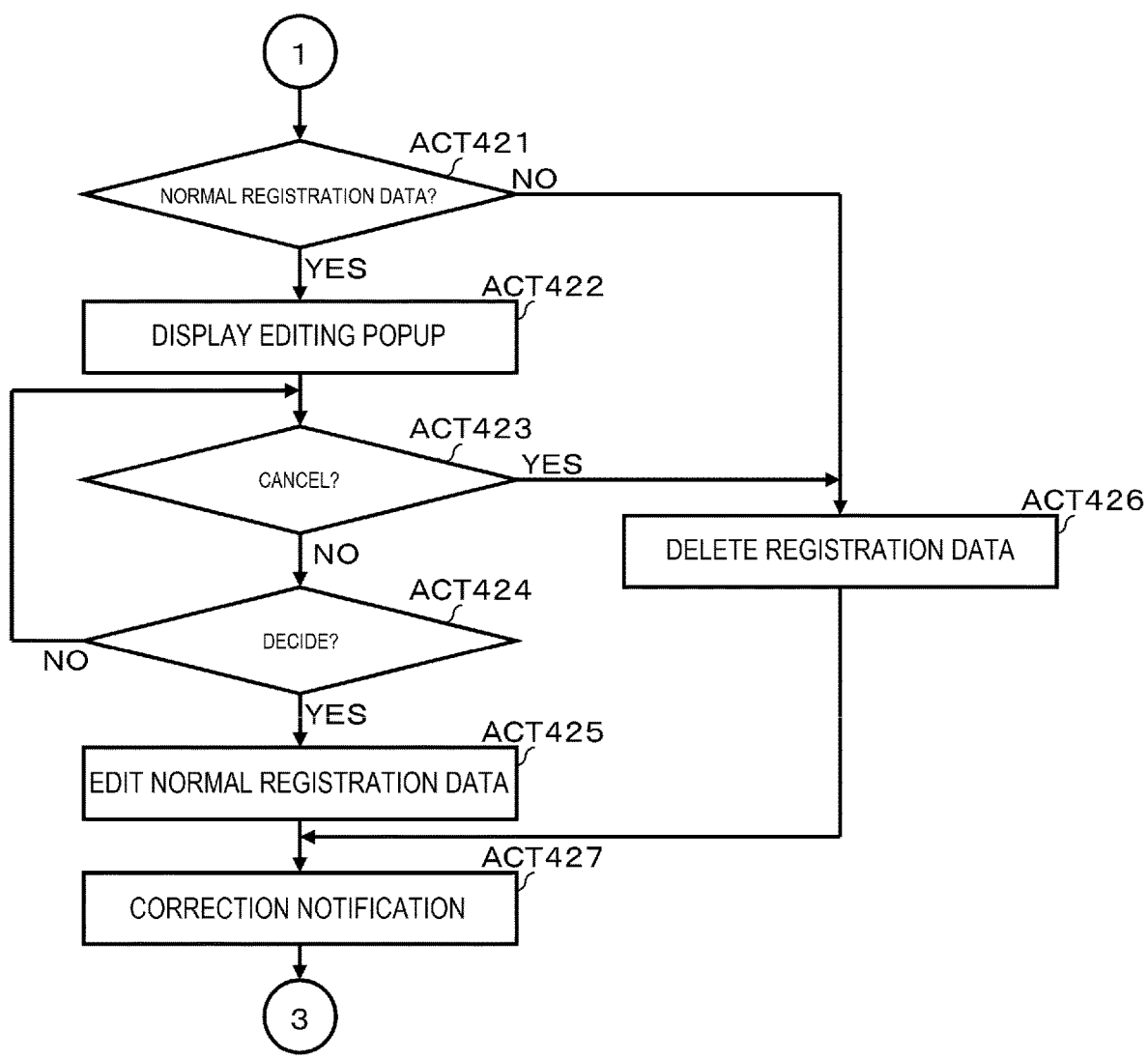
FIG. 16 is a flowchart illustrating the procedure of the main information processing according to an embodiment.
Figure 17:
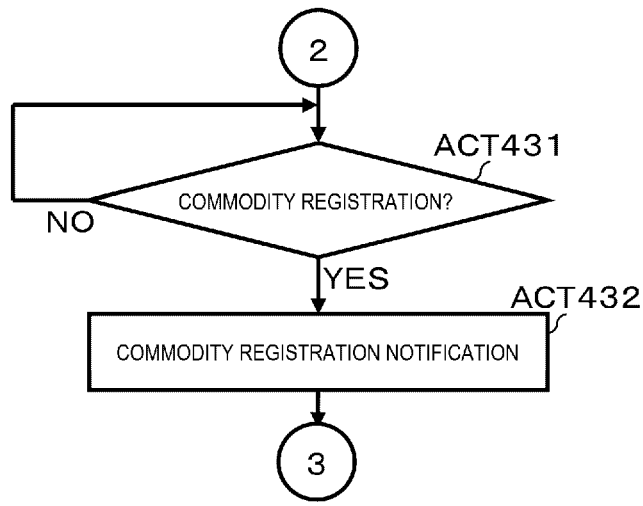
FIG. 17 is a flowchart illustrating the procedure of the main information processing according to an embodiment.
Figure 18:
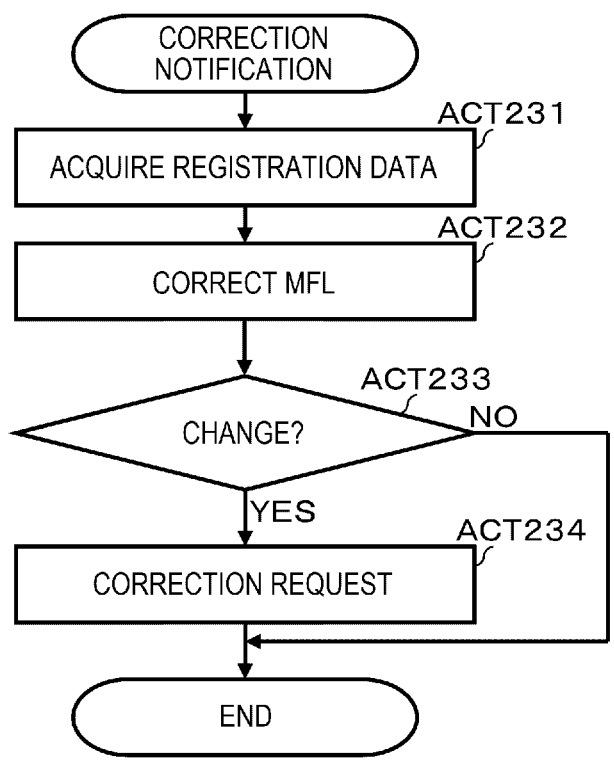
FIG. 18 is a flowchart illustrating a procedure of correction notification command reception processing executed by the processor of the terminal controller according to an embodiment.
Figure 19:
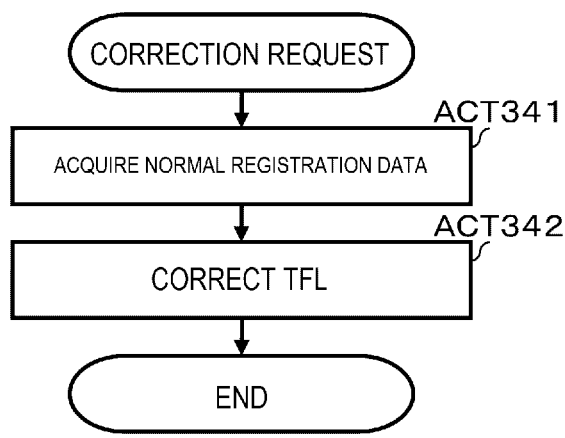
FIG. 19 is a flowchart illustrating a procedure of correction request command reception processing executed by the processor of the virtual POS server according to an embodiment.

FIGS. 15 to 17 are flowcharts illustrating procedures of main information processing executed by the processor 71 of the monitoring terminal 70 according to the monitoring support program APL2. FIG. 18 is a flowchart of a procedure of information processing executed by the processor 41 of the terminal controller 40 in response to the information processing of the monitoring terminal 70. FIG. 19 is a flowchart illustrating a procedure of information processing executed by the processor 21 of the virtual POS server 20 in response to the information processing of the terminal controller 40. FIGS. 20 to 23 are examples of various images displayed on the touch panel 75 of the monitoring terminal 70. The operation explained below is an example. The procedures and the like are not particularly limited if the same result is obtained.

First, in ACT 401, the processor 71 of the monitoring terminal 70 collects the mobile information file MFL from the terminal controller 40. Specifically, the processor 71 controls the wireless device 74 to collect a mobile information file. According to this control, a collection command is wirelessly transmitted from the wireless device 74. The collection command is received by the access point 50 connected by the wireless LAN and transmitted to the terminal controller 40 via the communication network 80. The processor 41 of the terminal controller 40, which receives the collection command via the communication interface 44, collectively acquires the mobile information file MFL in which the second status S2 is other than "3" out of the mobile information files MFL stored in the auxiliary storage device 43. The processor 41 controls the communication interface 44 to transmit the acquired mobile information file MFL to the monitoring terminal 70. According to this control, data of the mobile information file MFL is output from the communication interface 44. The data is wirelessly transmitted via the access point 50 and received by the monitoring terminal 70.

If collecting the mobile information file MFL from the terminal controller 40 in this way, in ACT 402, the processor stores the mobile information file MFL. A storage destination of the mobile information file MFL may be the volatile memory region of the main memory 72 or may be the auxiliary storage device 73. In the following information, the collected mobile information file MFL is referred to as collected mobile information file MFL3.

In ACT 403, the processor 71 generates image data of a monitoring screen SC1 (see FIG. 20) based on the data of the collected mobile information file MFL3. The processor 71 outputs the image data to the touch panel 75 and causes the touch panel 75 to display the monitoring screen SC1.

Figure 20:
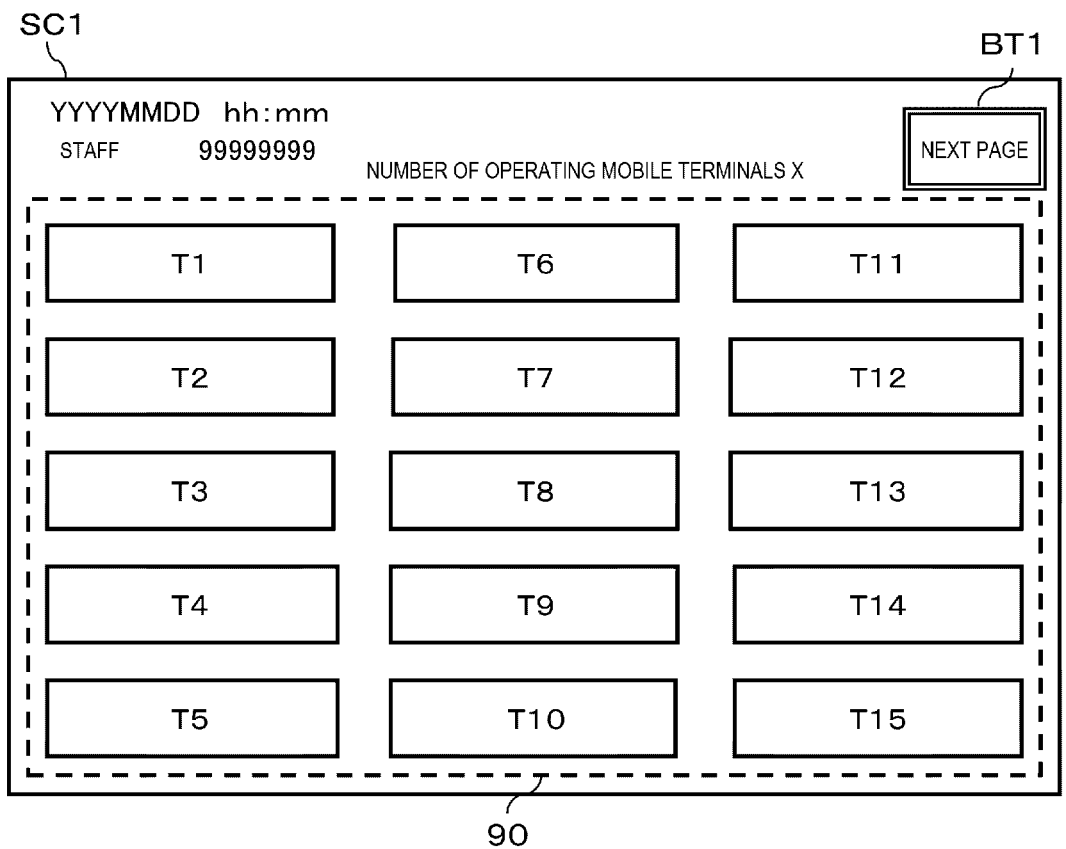
FIG. 20 is a diagram illustrating a display example of a monitoring screen displayed in the mobile terminal according to an embodiment.

FIG. 20 is a display example of the monitoring screen SC1. As illustrated in FIG. 20, a state display area 90 for displaying a state of the mobile terminal 60 and a next page button BT1 are displayed on the monitoring screen SC1. In the state display area 90, fifteen state display sections Tx in total are arranged in a 5×3 matrix shape. Incidentally, "x" of the state display sections Tx indicates an integer equal to or larger than 1. The next page button BT1 is an image of a button for instructing to switch the state display sections Tx (T1 to T15) displayed in the state display area 90 to the next state display sections Tx (T16 to T30). After the state display area 90 is switched to the next state display sections Tx (T16 to T30), the next page button BT1 changes to a previous page button. Alternatively, the previous page button is displayed side by side with the next page button BT1. The previous page button is an image of a button for instructing to return the other state display sections Tx (T16 to T30) displayed in the state display area 90 to the original state display sections Tx (T1 to T15). The next page button BT1 and the previous page button are examples of operators reproduced on the screen of the touch panel 75 by software. A layout of the monitoring screen SC1 is not particularly limited.

Each of a plurality of state display sections Tx displayed in the state display area 90 corresponds to one mobile terminal 60.

Figure 21:
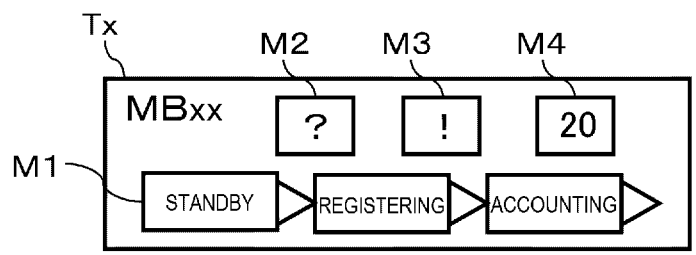
FIG. 21 is a diagram illustrating a display example of a state display section displayed in the mobile terminal according to an embodiment.

FIG. 21 is a display example of the state display section Tx. As an example, the state display section Tx displays a terminal ID "MBxx" of the mobile terminal 60 corresponding thereto. The state display section Tx displays a first mark M1 for identifying whether the corresponding mobile terminal is on standby, performing registration, or performing accounting. "Standby" is lit in the first mark M1 if the second status S2 of the collected mobile information file MFL3 in which the terminal ID of the corresponding mobile terminal 60 is set to "0" indicating the first state before the commodity registration start. "Registering" is lit in the first mark M1 if the second status S2 is "1" indicating the second state after the commodity registration start. "Accounting" is lit in the first mark M1 if the second status S2 is "2" indicating the third state after the accounting declaration. The mobile information file MFL in which the second status S2 is "3" indicating the fourth state after the accounting end is not collected. Therefore, the state display section Tx corresponding to the terminal ID of the mobile information file MFL is not displayed in the state display area 90.

The state display section Tx further displays a second mark M2, a third mark M3, and a fourth mark M4. The second mark M2 is lit if error registration data of a commodity registration error is stored in the collected mobile information file MFL3. The third mark M3 is lit if error registration data of a discount error is stored. The fourth mark M4 is lit if normal registration data of a commodity with an age limit is stored. Types of marks displayed in the state display section Tx are not limited to the first mark M1 through the fourth mark M4 explained above.

If receiving, for example, a correction request for the registration data, a store clerk in charge of an attendant, who is an operator of the monitoring terminal 70, recognizes the terminal ID of the mobile terminal 60 that the consumer uses for commodity registration. For example, terminal IDs set in the mobile terminals 60 are displayed on the touch panels 65 of the mobile terminals 60. Therefore, the store clerk recognizes the terminal ID of the mobile terminal 60 from this display.

The store clerk recognizing the terminal ID searches for a state display section Tx' on which the terminal ID is displayed out of the plurality of state display sections Tx displayed in the state display area 90. If finding the relevant state display section Tx1, the store clerk touches the state display section Tx1. In this way, the store clerk designates the mobile terminal 60 in which the registration data requested to be corrected by the consumer is registered.

Referring back to FIG. 15, in ACT 404, the processor 71 of the monitoring terminal 70, which displays the monitoring screen SC1, waits for the mobile terminal 60 to be designated. If detecting that the mobile terminal 60 is designated by the operation of the store clerk, the processor 71 determines YES in ACT 404 and proceeds to ACT 405. In ACT 405, the processor 71 acquires a terminal ID of the designated mobile terminal 60. In ACT 406, the processor 71 checks the second status S2 of the collected mobile information file MFL3 in which the terminal ID is set. If the second status S2 is "1", the processor 71 causes the touch panel 75 to display a list LS1 (see FIG. 22) of the registration data registered in the region B2.

Figure 22:
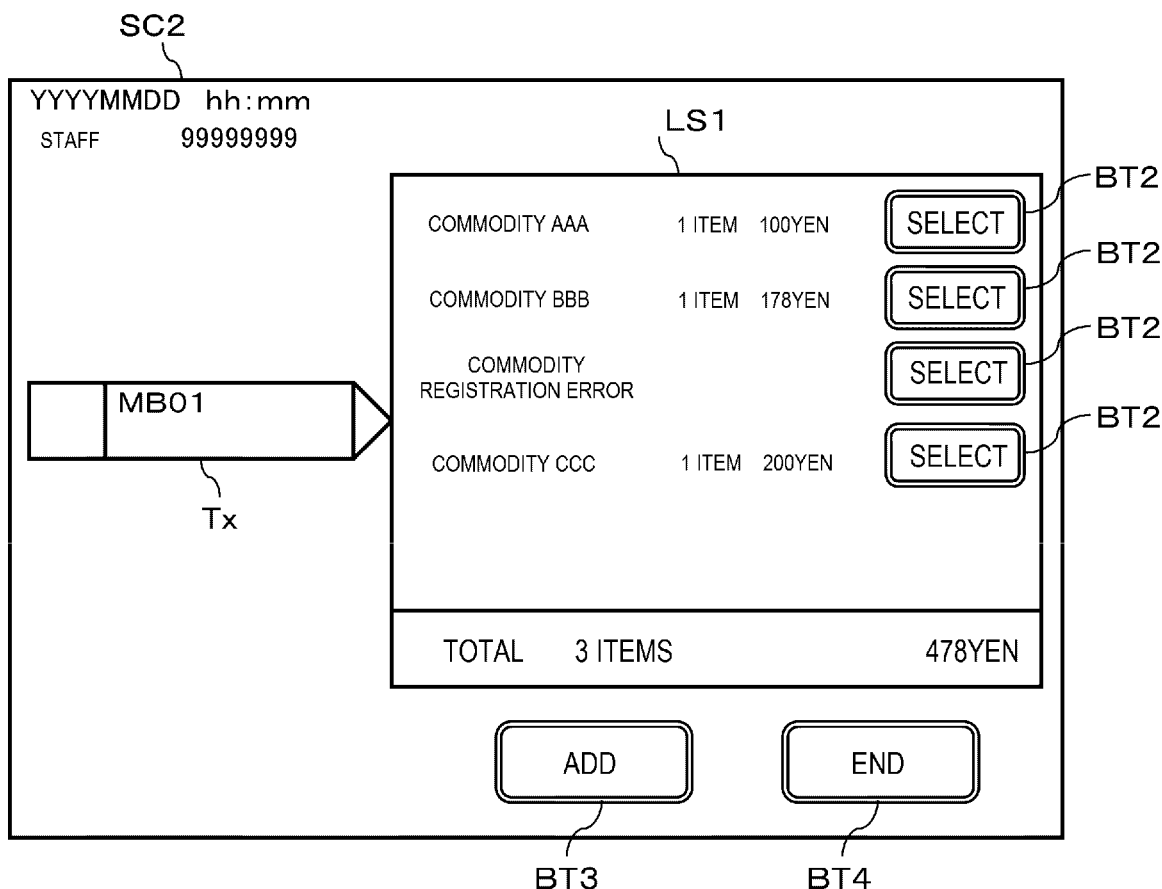
FIG. 22 is a diagram illustrating a display example of an image including a list displayed in the mobile terminal according to an embodiment.

FIG. 22 is a display example of an image SC2 including the list LS1. On the image SC2, the state display section Tx of the designated mobile terminal 60 and the list LS1 of the registration data by the mobile terminal 60 are displayed. Concerning the normal registration data, a commodity name, the number of items, and a price are displayed in the list LS1. Concerning the error registration data, information indicating error content is displayed in the list LS1. A selection button BT2 is correlated with the registration data and displayed. An addition button BT3 and an end button BT4 are also displayed on the image SC2. The selection button BT2, the addition button BT3, and the end button BT4 are examples of operators reproduced on the screen of the touch panel 75 by software. A layout of the image SC2 is not particularly limited.

If receiving the correction request for the registration data from the consumer, the store clerk confirming the list LS1 touches the selection button BT2 correlated with the registration data. If receiving a new request for commodity registration, the store clerk touches an addition button BT3. If ending the confirmation of the list LS1, the store clerk touches the end button BT4.

Referring back to FIG. 15, in ACT 408, the processor 71 of the monitoring terminal 70, which displays the image SC2, confirms whether the selection button BT2 is touched. If the selection button BT2 is not touched, the processor 71 determines NO in ACT 408 and proceeds to ACT 409. In ACT 409, the processor 71 confirms whether the addition button BT3 is touched. If the addition button BT3 is not touched, the processor 71 determines NO in ACT 409 and proceeds to ACT 410. In ACT 410, the processor 71 confirms whether the end button BT4 is touched. If the end button BT4 is not touched, the processor 71 determines NO in ACT 410 and returns to ACT 408. In ACT 408 to ACT 410, the processor 71 waits for the selection button BT2 to be touched, the addition button BT3 to be touched or the end button BT4 to be touched.

In the waiting state of ACT 408 to ACT 410, if the selection button BT2 is touched, the processor 71 determines YES in ACT 408 and proceeds to ACT 421 in FIG. 16. In ACT 421, the processor 71 confirms whether registration data correlated with the selection button BT2 is the normal registration data or the error registration data. If the registration data is the normal registration data, the processor 71 determines YES in ACT 421 and proceeds to ACT 422. In ACT 422, the processor 71 causes the touch panel 75 to display an editing popup image SC3 (see FIG. 23).

Figure 23:
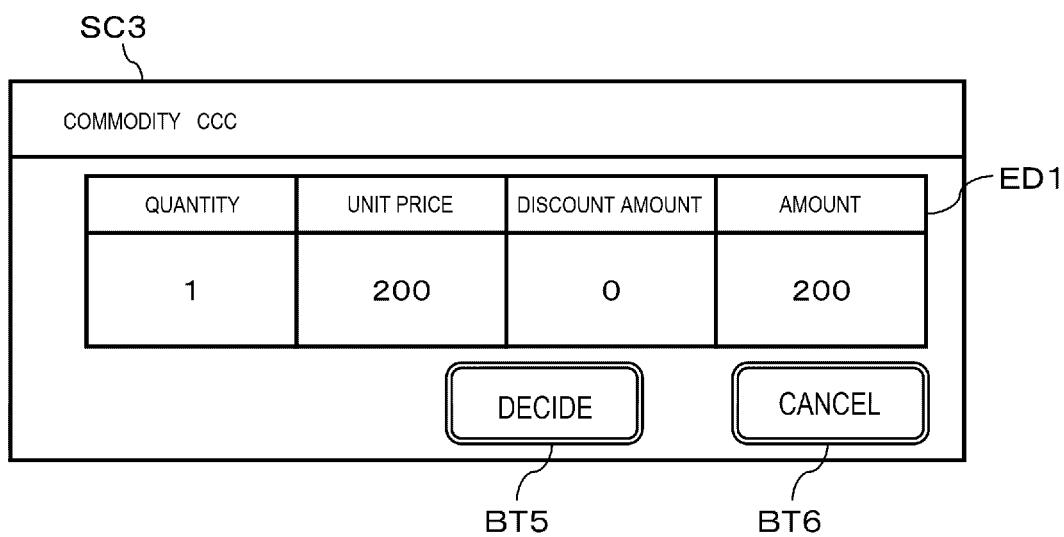
FIG. 23 is a diagram illustrating a display example of an editing popup image displayed in the mobile terminal according to an embodiment.

FIG. 23 is a display example of the editing popup image SC3. As illustrated in FIG. 23, a commodity name of the normal registration data selected by the selection button BT2 is displayed on the editing popup image SC3. An editing area ED1 for a quantity, a unit price, a discount amount, and an amount is displayed on the editing popup image SC3. A quantity (the number of items), a unit price (a price), a discount amount, and an amount of the normal registration data are displayed in the editing area ED1. Incidentally, the amount is an amount obtained by subtracting the discount amount from an amount obtained by multiplying the unit price by the quantity. Further, a decision button BT5 and a cancellation button BT6 are displayed in the editing area ED1. The decision button BT5 and the cancellation button BT6 are examples of operators reproduced on the screen of the touch panel 75 by software. A layout of the editing popup image SC3 is not particularly limited.

For example, if the consumer points out that the price of the normal registration data is wrong and the store clerk can confirm an error of the price, the store clerk operates the touch panel 75 and corrects the unit price in the editing area ED1 to a correct amount. Specifically, if a unit price area of the editing area ED1 is touched, since a ten key button is displayed, the store clerk operates the ten key button and inputs a correct unit price to the unit price area. Similarly, if the consumer points out that the discount amount of the normal registration data is wrong and the store clerk can confirm an error of the discount amount, the store clerk operates the touch panel 75 and corrects the discount amount in the editing area ED1 to a correct amount. If ending the correction of the editing area ED1, the store clerk touches the decision button BT5. On the other hand, if receiving a cancellation request for the normal registration data from the consumer, the store clerk touches the cancellation button BT6.

Referring back to FIG. 16, in ACT 423, the processor 71 of the monitoring terminal 70, which displays the editing popup image SC3, confirms whether the cancellation button BT6 is touched. If the cancellation button BT6 is not touched, the processor 71 determines NO in ACT 423 and proceeds to ACT 424. In ACT 424, the processor 71 confirms whether the decision button BT5 is touched. If the decision button BT5 is not touched, the processor 71 determines NO in ACT 424 and returns to ACT 423. In ACT 423 and ACT 424, the processor 71 waits for the cancellation button BT6 to be touched or the decision button BT5 to be touched.

In the waiting state of ACT 423 and ACT 424, if the decision button BT5 is touched, the processor 71 determines YES in ACT 424 and proceeds to ACT 425. In ACT 425, the processor 71 edits the normal registration data. That is, for example, if the unit price in the editing area ED1 is corrected, the processor 71 rewrites a price of the relevant normal registration data to an amount after the correction. For example, if the discount amount in the editing area ED1 is corrected, the processor 71 rewrites a discount amount of the relevant normal registration data to an amount after the correction. Thereafter, the processor 71 proceeds to ACT 427. Processing in ACT 427 is explained below.

On the other hand, if the registration data correlated with the touched selection button BT2 is the error registration data, the processor 71 determines NO in ACT 421. If the cancellation button BT6 of the editing popup image SC3 is touched, the processor 71 determines YES in ACT 423. In both cases, the processor 71 proceeds to ACT 426. In ACT 426, the processor 71 deletes the registration data. That is, if the registration data correlated with the selection button BT2 is the error registration data, the processor 71 deletes the error registration data from the collected mobile information file MFL3. Similarly, if the cancellation button BT6 is touched, the processor 71 deletes the normal registration data correlated with the selection button BT2 from the collected mobile information file MFL3. Thereafter, the processor 71 proceeds to ACT 427.

In ACT 427, the processor 71 controls the wireless device 74 to perform a correction notification. According to this control, a correction notification command is wirelessly transmitted from the wireless device 74. The correction notification command is received by the access point 50 connected by the wireless LAN and transmitted to the terminal controller via the communication network 80. The correction notification command includes data of the collected mobile information file MFL3 in which the registration data is edited.

If receiving the correction notification command via the communication interface 44, the processor 41 of the terminal controller 40 starts the information processing of the procedure illustrated in the flowchart of FIG. 18. In ACT 231, the processor 41 acquires the registration data from the collected mobile information file MFL3 included in the correction notification command. In ACT 232, the processor 41 corrects registration data of the mobile information file MFL in which the same terminal ID as the terminal ID in the collected mobile information file MFL3 is set to coincide with the registration data acquired from the collected mobile information file MFL3.

If finishing correcting the mobile information file MFL, in ACT 233, the processor 41 confirms whether correction for changing the normal registration data is performed. If the correction for changing the normal registration data is not performed, the processor 41 determines NO in ACT 233 and ends the reception processing for the correction notification command.

On the other hand, if the correction for changing the normal registration data is performed, the processor 41 determines YES in ACT 233 and proceeds to ACT 234. The processor controls the communication interface 44 to perform a correction request. The processor 41 ends the reception processing for the correction notification command. According to this control, the correction request command is output from the communication interface 44. The correction request command is transmitted to the virtual POS server 20 via the communication network 80. The correction request command includes data of the mobile information file MFL in which the normal registration data is changed.

If receiving the correction request command via the communication interface 24, the processor 21 of the virtual POS server 20 starts the information processing of the procedure illustrated in the flowchart of FIG. 19. In ACT 341, the processor 21 acquires the normal registration data from the mobile information file MFL included in the correction request command. In ACT 342, the processor 21 corrects normal registration data of the transaction information file TFL in which the same terminal ID as the terminal ID in the mobile information file MFL is set to coincide with the normal registration data acquired from the mobile information file MFL. The processor 21 ends the reception processing for the correction request command.

If the registration data stored in the mobile information file MFL is corrected in the monitoring terminal 70 in this way, content of the correction is reflected on the same mobile information file MFL stored in the terminal controller 40. If the normal registration data is corrected, content of the correction is reflected on the transaction information file TFL stored in the virtual POS server 20.

Referring back to FIG. 15, in the waiting state of ACT 408 to ACT 410, if the addition button BT3 is touched, the processor 71 determines YES in ACT 409 and proceeds to ACT 431 in FIG. 17. In ACT 431, the processor 71 waits for commodity registration.

The store clerk receiving a registration request for a commodity from the consumer reads a barcode attached to the commodity with the scanner 76. If the barcode is read by the scanner 76, the processor 71 determines YES in ACT 431 and proceeds to ACT 432. In ACT 432, the processor 61 controls the wireless device 74 to perform a commodity registration notification. According to this control, a commodity registration notification command is wirelessly transmitted from the wireless device 74. The commodity registration notification command is transmitted to the terminal controller 40 via the access point 50. The commodity registration notification command includes data of the barcode read by the scanner 76 and the terminal ID correlated with the designated state display section Tx.

The processor 41 of the terminal controller 40, which receives the commodity registration notification command, executes the processing in ACT 211 to ACT 218 explained with reference to FIG. 10 in the same manner. The processor 21 of the virtual POS server 20, which receives the commodity registration request command output from the terminal controller 40 in ACT 213, executes the processing in ACT 311 to ACT 320 explained with reference to FIG. 13 in the same manner.

Therefore, if a barcode of a commodity is scanned in the monitoring terminal 70, normal registration data generated based on data of the barcode is respectively added to the transaction information file TFL and the mobile information file MFL with the designated terminal ID.

In the waiting state of ACT 408 to ACT 410, if the end button BT4 is touched, the processor 71 determines YES in ACT 410 and proceeds to ACT 411. In ACT 411, the processor 71 erases the image SC2. The processor 71 returns to ACT 401.

As it is evident from the above explanation, the terminal controller 40 and the virtual POS server 20 include receiving units. That is, the terminal controller 40 receives, via the communication interface 44, the commodity registration notification command transmitted from the mobile terminal 60. The commodity registration notification command includes the data of the barcode as the data based on the purchased commodity. The virtual POS server 20 receives, via the communication interface 24, the commodity registration request command transmitted from the terminal controller 40. The commodity registration request command also includes the data of the barcode as the data based on the purchased commodity.

The virtual POS server 20 includes a generating unit (e.g., as part of processor 21). That is, the virtual POS server 20 generates normal registration data and error registration data based on the data of the barcode. The normal registration data includes a commodity name, a price, the number of items, and a discount amount of the purchased commodity. The normal registration data is an example of commodity sales data. The error registration data includes the data of the barcode. The error registration data is an example of data based on the purchased commodity not leading to generation of the commodity sales data.

The virtual POS server 20 includes a first storing unit (e.g., first memory). The terminal controller 40 includes a second storing unit. That is, the virtual POS server 20 stores the normal registration data in the transaction information file TFL. The terminal controller 40 stores the normal registration data and the error registration data in the mobile information file MFL.

The monitoring terminal 70 includes an acquiring unit (e.g., as part of processor 21). That is, the monitoring terminal 70 acquires, from the data stored in the mobile information file MFL, commodity sales data generated based on data based on the purchased commodity input in any one of the mobile terminals 60 and data based on the purchased commodity not leading to generation of the commodity sales data.

The monitoring terminal 70 includes a selecting unit (e.g., a user interface). That is, the monitoring terminal 70 receives, via the touch panel 75, a selection input of the state display section Tx displayed on the monitoring screen SC1 to select the mobile terminal 60 corresponding to the state display section Tx.

The monitoring terminal 70 includes a display unit. That is, if the state display section Tx is selected, the monitoring terminal 70 displays, on the touch panel 75, the image SC2 including a list LX1 of the normal registration data and the error registration data generated from data based on the purchased commodity input in the mobile terminal 60 corresponding to the state display section Tx.

The monitoring terminal 70 includes a correction instructing unit. That is, the monitoring terminal 70 causes the touch panel 75 to display the editing popup image SC3 and receives correction of the normal registration data or the error registration data displayed in the list LX1. The monitoring terminal 70 outputs a correction notification command to the terminal controller 40 and performs a correction instruction.

The terminal controller 40 and the virtual POS server 20 include correcting units. That is, the terminal controller 40 corrects, according to the correction notification command, the normal registration data or the error registration data stored in the mobile information file MFL. The terminal controller 40 outputs a correction request command to the virtual POS server 20. The virtual POS server 20 corrects the normal registration data of the transaction information file TFL according to the correction request command.

The monitoring terminal 70 includes an input unit (e.g., I/O device). That is, the monitoring terminal 70 inputs, as data based on the purchased commodity, the data of the barcode read by the scanner 76. The monitoring terminal 70 outputs a commodity registration notification command including the input data to the terminal controller 40.

The terminal controller 40 and the virtual POS server 20 include adding units. That is, the terminal controller 40 adds the normal registration data to the mobile information file MFL according to the commodity registration notification command. The terminal controller 40 outputs the commodity registration request command to the virtual POS server 20. The virtual POS server 20 adds the normal registration data to the transaction information file TFL according to the commodity registration request command.

With the store system 100 including the monitoring terminal 70, the terminal controller 40, and the virtual POS server 20 having such configurations, even if there is an error in data input by the consumer via the mobile terminal 60, the store clerk can operate the monitoring terminal 70 and correct the error without discarding the data. Therefore, it is possible to reduce a load required for data processing of the terminal controller 40 and the virtual POS server 20 for processing data input via the mobile terminal 60.

The consumer or the store clerk does not consume time for inputting data to the accounting machine 30 again. Therefore, a processing time required for accounting is also reduced. A human load is also reduced. Therefore, it is possible to achieve efficient store operation.

The store system 100 in the embodiment is explained above. However, the embodiment is not limited to this.

In the embodiment, the server of the store system 100 is configured by the terminal controller 40 and the virtual POS server 20. However, the server is not limited to such a configuration. For example, the functions of the terminal controller 40 and the virtual POS server 20 may be realized by one server. In this case, the mobile information file MFL and the transaction information file TFL may be integrated into the mobile information file MFL. In that case, in the accounting machine 30, if the error registration data is included in the mobile information file MFL, the settlement processing only has to be determined as an error. Consequently, it is possible to realize the store system configured from the server including the receiving unit, the generating unit, the storing unit, and the correcting unit and the monitoring terminal 70 including the acquiring unit and the correction instructing unit. It is also possible to realize the store system 100 in which the monitoring terminal 70 includes the selecting unit and the input unit and the server includes the adding unit. Further, it is also possible to realize the store system 100 in which the monitoring terminal 70 includes the display unit.

The generating unit is not always necessary. That is, the server receives data based on purchased commodities respectively input in the plurality of mobile terminals 60 and stores the data in the mobile information file MFL. The monitoring terminal 70 acquires, from the data stored in the mobile information file MFL, the data based on the purchased commodity input in any one of the mobile terminals 60 and instructs correction. The server executes the instructed correction concerning the data stored in the mobile information file MFL. Even in the store system having such a configuration, if there is an error in data input via the mobile terminal 60, it is possible to correct the error without discarding the data. It is possible to reduce a load required for the data processing of the server.

In the embodiment, the identification information of the mobile terminal 60 set in the mobile information file MFL and the transaction information file TFL is the terminal ID. The identification information is not limited to the terminal ID. For example, a unique identification code optionally generated by the terminal controller 40, which receives the use start notification from the mobile terminal 60, may be temporarily used as the identification information of the mobile terminal 60.

An input device configuring the input unit of the monitoring terminal 70 is not limited to the scanner 76. The input unit may be configured by an input device such as a touch panel, a keyboard, or an RFID reader.

Besides, the several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A system comprising:
   a server including:
      a first processor;
      a receiver configured to receive data relating to purchased commodities respectively input to a plurality of mobile terminals; and
      a memory configured to store the data received by the receiver; and
   a store terminal including a second processor configured to:
      acquire, from the memory, the data relating to the purchased commodity input to any one of the mobile terminals; and
      instruct the first processor to correct the data stored by the memory and acquired by the second processor, wherein
   the store terminal further includes:
      a user interface configured to enable selection of a mobile terminal from the plurality of mobile terminals; and
      an input device configured to input the data relating to the purchased commodities, and
      the first processor is further configured to add the data relating to the purchased commodities input by the input device to the memory as the data relating to the purchased commodity input to the selected mobile terminal.

2. The system according to claim 1, wherein
   the store terminal further includes a display configured to display a list of the data relating to the purchased commodity input to the selected mobile terminal, and
   the second processor is further configured to instruct the first processor to correct the data displayed in the list.

3. The system according to claim 2, wherein the display and the user interface are integrated as a touch panel.

4. The system according to claim 1, wherein the data relating to the purchased commodity input to any one of the plurality of mobile terminals includes a commodity code, a commodity name, a price, the number of items, a discount amount, and an error flag.

5. The system according to claim 1, wherein the plurality of mobile terminals are configured to scan a barcode of the purchased commodity to obtain the data based on the purchased commodity.

6. The system according to claim 1, further comprising a commodity database configured to store a plurality of commodity data records and communicate with the server; wherein
   the first processor is further configured to query the commodity database using the data relating to the purchased commodity to retrieve at least one of the plurality of commodity data records associated with the purchased commodity.

7. The system according to claim 1, wherein the server further comprises an auxiliary storage device configured to store at least one of a plurality of transaction information files or a plurality of mobile information files.

8. The system according to claim 7, wherein each transaction information file includes a mobile terminal ID, normal registration data of the purchased commodities, and a status of the transaction information file.

9. The system according to claim 7, wherein each mobile information file includes a mobile terminal ID, error registration data of the purchased commodities, and a status of the mobile information file.

10. A system comprising:
    a server including:
       a receiver configured to receive data relating to purchased commodities respectively input to a plurality of mobile terminals;
       a first processor configured to generate commodity sales data based on the data received by the receiver;
       a first memory configured to store the commodity sales data generated by the first processor; and
       a second memory configured to store the commodity sales data generated by the first processor and data relating to the purchased commodity from which commodity sales data was not generated; and
    a store terminal including a second processor configured to:
       acquire, from the second memory, commodity sales data generated from the data relating to the purchased commodity input to any one of the plurality of mobile terminals and the data relating to a purchased commodity from which commodity sales data is not generated; and
       instruct the first processor to correct, from data stored in the first memory and the second memory, the commodity sales data acquired by the second processor or the data relating to the purchased commodities, wherein the store terminal further includes:
- a user interface configured to enable selection of a mobile terminal from the plurality of mobile terminals; and
- an input device configured to input the data relating to the purchased commodities, and
- the first processor is further configured to add the commodity sales data generated from the data relating to the purchased commodities input by the input device to the first memory and the second memory as commodity sales data generated by the data relating to the purchased commodity input to the selected mobile terminal.

11. The system according to claim 10, wherein the store terminal further includes a display configured to display a list of the commodity sales data generated from the data relating to the purchased commodity input to the selected mobile terminal and the data relating to the purchased commodity from which commodity sales data is not generated, and the second processor is further configured to instruct the first processor to correct the data displayed in the list.

12. The system according to claim 11, wherein the display and the user interface are integrated as a touch panel.

13. The system according to claim 10, wherein the data relating to the purchased commodity input to any one of the plurality of mobile terminals includes a commodity code, a commodity name, a price, the number of items, a discount amount, and an error flag.

14. The system according to claim 10, wherein the plurality of mobile terminals are configured to scan a barcode of the purchased commodity to obtain the data relating to the purchased commodity.

15. The system according to claim 10, further comprising a commodity database configured to store a plurality of commodity data records and communicate with the server; wherein the first processor is further configured to query the commodity database using the data relating to the purchased commodity to retrieve at least one of the plurality of commodity data records associated with the purchased commodity.

16. The system according to claim 10, wherein the server further comprises an auxiliary storage device configured to store at least one of a plurality of transaction information files or a plurality of mobile information files.

17. The system according to claim 16, wherein each transaction information file includes a mobile terminal ID, normal registration data of the purchased commodities, and a status of the transaction information file.

18. The system according to claim 16, wherein each mobile information file includes a mobile terminal ID, error registration data of the purchased commodities, and a status of the mobile information file.

\* \* \* \* \*